United States Patent
Akkarakaran et al.

(10) Patent No.: US 11,671,863 B2
(45) Date of Patent: *Jun. 6, 2023

(54) HANDLING OF RADIO FREQUENCY FRONT-END GROUP DELAYS FOR ROUND TRIP TIME ESTIMATION

(71) Applicant: QUALCOMM Incorporated, San Diego, CA (US)

(72) Inventors: Sony Akkarakaran, Poway, CA (US); Tao Luo, San Diego, CA (US); Joseph Binamira Soriaga, San Diego, CA (US); Alexandros Manolakos, Escondido, CA (US); Naga Bhushan, San Diego, CA (US); Guttorm Ringstad Opshaug, Redwood City, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/476,316

(22) Filed: Sep. 15, 2021

(65) Prior Publication Data
US 2022/0007226 A1    Jan. 6, 2022

Related U.S. Application Data

(63) Continuation of application No. 16/665,798, filed on Oct. 28, 2019, now Pat. No. 11,159,972.

(30) Foreign Application Priority Data

Oct. 31, 2018 (GR) .............................. 20180100495

(51) Int. Cl.
*H04W 24/10* (2009.01)
*H04W 64/00* (2009.01)
(Continued)

(52) U.S. Cl.
CPC ........... *H04W 24/10* (2013.01); *H04W 64/00* (2013.01); *H04W 72/044* (2013.01); *H04W 72/23* (2023.01); *H04W 72/51* (2023.01)

(58) Field of Classification Search
CPC ........... H04W 56/004; H04W 56/0055; H04W 24/10; H04W 56/009; H04W 64/00;
(Continued)

(56) References Cited

U.S. PATENT DOCUMENTS 6,368,279 B1    4/2002   Liu
6,490,456 B1   12/2002   Bogdan et al.
(Continued)

FOREIGN PATENT DOCUMENTS

EP    0911993 A2    4/1999
EP    1093318 A2    4/2001

OTHER PUBLICATIONS

International Search Report and Written Opinion—PCT/US2019/058606—ISA/EPO—dated Jan. 30, 2020.
(Continued)

*Primary Examiner* — Ahmed Elallam
(74) *Attorney, Agent, or Firm* — Thien T. Nguyen

(57) ABSTRACT

Disclosed are techniques for handling of radio frequency front-end group delays (GDs) for round trip time (RTT) estimation. In an aspect, a network entity determines information indicating a network total GD and a user equipment (UE) determines information indicating a UE total GD. The network entity transmits one or more RTT measurement (RTTM) signals to the UE, each including a RTTM waveform. The UE determines one or more one or more RTT response (RTTR) payloads for one or more RTTR signals, each including a RTTR waveform. The UE transmits the RTTR signal(s) to the network entity. For each RTTR signal, a transmission time of the RTTR waveform and/or the RTTR
(Continued)

payload is/are determined based on the UE total GD. The network entity determines a RTT between the UE and the network entity based on the RTTM signal(s), the RTTR signal(s), and the information indicating the network total GD.

34 Claims, 15 Drawing Sheets

(51) Int. Cl.
    *H04W 72/04* (2023.01)
    *H04W 72/044* (2023.01)
    *H04W 72/23* (2023.01)
    *H04W 72/51* (2023.01)

(58) Field of Classification Search
    CPC ............ H04W 72/042; H04W 72/044; H04W 72/048; H04W 56/005; H04W 56/0065; H04L 43/0864; H04B 17/14; G01S 13/765; G01S 13/48; G01S 5/012; G01S 5/021; G01S 5/0218
    See application file for complete search history.

(56) References Cited

U.S. PATENT DOCUMENTS

| | | | |
|---|---|---|---|
| 6,681,099 B1 | 1/2004 | Keranen et al. | |
| 7,466,266 B2 | 12/2008 | Opshaug | |
| 8,326,324 B2 | 12/2012 | Wu et al. | |
| 8,335,289 B2 | 12/2012 | Park et al. | |
| 8,339,972 B2 | 12/2012 | Hirsch et al. | |
| 8,837,316 B2 * | 9/2014 | Zhang | H04W 64/00 455/67.11 |
| 8,879,564 B2 | 11/2014 | Ryu et al. | |
| 8,880,096 B2 | 11/2014 | Rousu et al. | |
| 8,885,473 B2 | 11/2014 | Chan et al. | |
| 8,948,063 B2 | 2/2015 | Aryan et al. | |
| 9,143,418 B2 | 9/2015 | Den Hartog et al. | |
| 9,185,670 B2 | 11/2015 | Siomina et al. | |
| 9,277,369 B2 | 3/2016 | Lindskog et al. | |
| 9,288,625 B2 | 3/2016 | Lindskog et al. | |
| 9,547,068 B2 | 1/2017 | Do et al. | |
| 9,648,573 B2 | 5/2017 | Siomina et al. | |
| 9,705,770 B2 | 7/2017 | Cavaliere et al. | |
| 9,949,160 B2 | 4/2018 | Fischer | |
| 10,039,073 B2 * | 7/2018 | Kakani | G01S 5/14 |
| 10,057,147 B2 | 8/2018 | Park et al. | |
| 10,419,324 B2 | 9/2019 | Burbridge et al. | |
| 10,505,653 B1 | 12/2019 | Berger et al. | |
| 10,547,979 B2 | 1/2020 | Edge et al. | |
| 10,554,568 B2 | 2/2020 | Flajslik et al. | |
| 10,686,573 B2 | 6/2020 | Jung et al. | |
| 10,848,256 B2 | 11/2020 | Akkarakaran et al. | |
| 11,096,141 B2 * | 8/2021 | Fang | G01S 3/50 |
| 11,159,972 B2 * | 10/2021 | Akkarakaran | G01S 5/012 |
| 2011/0170463 A1 | 7/2011 | Aryan et al. | |
| 2012/0295623 A1 | 11/2012 | Siomina et al. | |
| 2015/0350946 A1 | 12/2015 | Das et al. | |
| 2015/0382152 A1 | 12/2015 | Lindskog et al. | |
| 2016/0323799 A1 | 11/2016 | Morgan et al. | |
| 2017/0188248 A1 | 6/2017 | Muller et al. | |
| 2019/0245663 A1 | 8/2019 | Kim et al. | |
| 2019/0312689 A1 | 10/2019 | Opshaug et al. | |
| 2020/0021949 A1 | 1/2020 | Edge et al. | |
| 2020/0120009 A1 | 4/2020 | Im et al. | |
| 2020/0137607 A1 | 4/2020 | Akkarakaran et al. | |
| 2020/0153517 A1 | 5/2020 | Akkarakaran et al. | |
| 2021/0036790 A1 | 2/2021 | Akkarakaran et al. | |

OTHER PUBLICATIONS

International Search Report and Written Opinion—PCT/US2019/060594—ISA/EPO—dated Apr. 28, 2020.

* cited by examiner

HANDLING OF RADIO FREQUENCY FRONT-END GROUP DELAYS FOR ROUND TRIP TIME ESTIMATION

CROSS-REFERENCE TO RELATED APPLICATION

The present Application for Patent is a continuation of U.S. patent application Ser. No. 16/665,798, entitled "HANDLING OF RADIO FREQUENCY FRONT-END GROUP DELAYS FOR ROUND TRIP TIME ESTIMATION," filed Oct. 28, 2019, which claims priority under 35 U.S.C. § 119 to Greek Patent Application No. 20180100495, entitled "HANDLING OF RADIO FREQUENCY FRONT-END GROUP DELAYS FOR ROUND TRIP TIME ESTIMATION," filed Oct. 31, 2018, assigned to the assignee hereof, to which the present Application for Patent also claims priority, each of which is expressly incorporated herein by reference in its entirety.

TECHNICAL FIELD

Various aspects described herein generally relate to wireless communication systems, and more particularly, to handling of radio frequency (RF) front-end group delays (GDs) for round trip time (RTT) estimation.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

Propagation loss is also an issue in Multiple Input-Multiple Output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may hereinafter refer to transmit beamforming, receive beamforming, or both. Traditionally, when a transmitter broadcasts an RF signal, it broadcasts the RF signal in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station).

Where a transmitter uses beamforming to transmit RF signals, the beams of interest for data communication between the transmitter and receiver will be the beams carrying RF signals having the highest received signal strength (or highest received Signal to Noise plus Interference Ratio (SINR), for example, in the presence of a directional interfering signal). However, the receiver's ability to perform certain tasks may suffer when the receiver relies upon the beam with the highest received signal strength. For example, in a scenario where the beam with the highest received signal strength travels over a non-LOS (NLOS) path that is longer than the shortest path (i.e., a LOS path or a shortest NLOS path), the RF signals may arrive later than RF signal(s) received over the shortest path due to propagation delay. Accordingly, if the receiver is performing a task that requires precise timing measurements and the beam with the highest received signal strength is affected by longer propagation delay, then the beam with the highest received signal strength may not be optimal for the task at hand.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary method performed by a network entity is disclosed. The method may comprise determining a network total group delay (GD) comprising a network transmission GD and a network reception GD. The network transmission GD may indicate a time interval between a measured transmission time of a network Tx signal transmitted from the network entity and an actual transmission time of the network Tx signal leaving the network entity. The network reception GD may indicate a time interval between an actual arrival time of a network Rx signal at the network entity and a measured arrival time of the network Rx signal at the network entity. The method may also comprise transmitting, to a user equipment (UE), one or more round trip time (RTT) measurement (RTTM) signals on RTTM resources comprising downlink (DL) physical layer resources. Each RTTM signal may comprise an RTTM waveform. The method may further comprise receiving, from the UE, one or more RTT response (RTTR) signals on RTTR resources comprising uplink (UL) physical layer resources. Each RTTR signal may correspond to one or more of the transmitted RTTM signals and may comprise an RTTR waveform and an RTTR payload. The method may yet further comprise determining an RTT between the UE and the network entity based on the RTTM signal(s), the RTTR signal(s), and the network total GD.

An exemplary method performed by a user equipment (UE) is disclosed. The method may comprise determining a UE group delay (GD) comprising a UE transmission GD and a UE reception GD. The UE transmission GD may indicate a time interval between a measured transmission time of a UE Tx signal transmitted from the UE and an actual transmission time of the UE Tx signal leaving the UE. The UE reception GD may indicate a time interval between an actual arrival time of a UE Rx signal at the UE and a measured arrival time of the UE Rx signal at the UE. The method may also comprise receiving, from a network entity, one or more round trip time (RTT) measurement (RTTM) signals on RTTM resources comprising downlink (DL) physical layer resources. Each RTTM signal may comprise an RTTM waveform. The method may further comprise determining one or more RTT response (RTTR) payloads for one or more RTTR signals. Each RTTR signal may correspond to one or more of the received RTTM signals and may comprise an RTTR waveform and the RTTR payload. The method may yet further comprise transmitting, to the network entity, the one or more RTT response (RTTR) signals on RTTR resources comprising uplink (UL) physical layer resources. For each RTTR signal, a transmission timing of the RTTR waveform may be determined based on the UE total GD, or the RTTR payload may be determined based on the UE total GD, or both.

An exemplary network entity is disclosed. The network entity may comprise a communication device, a processor and a memory configured to determine a network total group delay (GD) comprising a network transmission GD and a network reception GD. The network transmission GD may indicate a time interval between a measured transmission time of a network Tx signal transmitted from the network entity and an actual transmission time of the network Tx signal leaving the network entity. The network reception GD may indicate a time interval between an actual arrival time of a network Rx signal at the network entity and a measured arrival time of the network Rx signal at the network entity. The communication device, the processor and the memory are also configured to transmit, to a user equipment (UE), one or more round trip time (RTT) measurement (RTTM) signals on RTTM resources comprising downlink (DL) physical layer resources. Each RTTM signal may comprise an RTTM waveform. The communication device, the processor and the memory are further configured to receive, from the UE, one or more RTT response (RTTR) signals on RTTR resources comprising uplink (UL) physical layer resources. Each RTTR signal may correspond to one or more of the transmitted RTTM signals and may comprise an RTTR waveform and an RTTR payload. The communication device, the processor and the memory are yet further configured to determine an RTT between the UE and the network entity based on the RTTM signal(s), the RTTR signal(s), and the network total GD.

An exemplary user equipment (UE) is disclosed. The UE may comprise a communication device, a processor and a memory configured to determine a UE group delay (GD) comprising a UE transmission GD and a UE reception GD. The UE transmission GD may indicate a time interval between a measured transmission time of a UE Tx signal transmitted from the UE and an actual transmission time of the UE Tx signal leaving the UE. The UE reception GD may indicate a time interval between an actual arrival time of a UE Rx signal at the UE and a measured arrival time of the UE Rx signal at the UE. The communication device, the processor and the memory are also configured to receive, from a network entity, one or more round trip time (RTT) measurement (RTTM) signals on RTTM resources comprising downlink (DL) physical layer resources. Each RTTM signal may comprise an RTTM waveform. The communication device, the processor and the memory are further configured to determine one or more RTT response (RTTR) payloads for one or more RTTR signals. Each RTTR signal may correspond to one or more of the received RTTM signals and may comprise an RTTR waveform and the RTTR payload. The communication device, the processor and the memory are yet further configured to transmit, to the network entity, the one or more RTT response (RTTR) signals on RTTR resources comprising uplink (UL) physical layer resources. For each RTTR signal, a transmission timing of the RTTR waveform may be determined based on the UE total GD, or the RTTR payload may be determined based on the UE total GD, or both.

An exemplary network entity is disclosed. The network entity may comprise means for determining a network total group delay (GD) comprising a network transmission GD and a network reception GD. The network transmission GD may indicate a time interval between a measured transmission time of a network Tx signal transmitted from the network entity and an actual transmission time of the network Tx signal leaving the network entity. The network reception GD may indicate a time interval between an actual arrival time of a network Rx signal at the network entity and a measured arrival time of the network Rx signal at the network entity. The network entity may also comprise means for transmitting, to a user equipment (UE), one or more round trip time (RTT) measurement (RTTM) signals on RTTM resources comprising downlink (DL) physical layer resources. Each RTTM signal may comprise an RTTM waveform. The network entity may further comprise means for receiving, from the UE, one or more RTT response (RTTR) signals on RTTR resources comprising uplink (UL) physical layer resources. Each RTTR signal may correspond to one or more of the transmitted RTTM signals and may comprise an RTTR waveform and an RTTR payload. The network entity may yet further comprise means for determining an RTT between the UE and the network entity based on the RTTM signal(s), the RTTR signal(s), and the network total GD.

An exemplary user equipment (UE) is disclosed. The UE may comprise means for determining a UE group delay (GD) comprising a UE transmission GD and a UE reception GD. The UE transmission GD may indicate a time interval between a measured transmission time of a UE Tx signal transmitted from the UE and an actual transmission time of the UE Tx signal leaving the UE. The UE reception GD may indicate a time interval between an actual arrival time of a UE Rx signal at the UE and a measured arrival time of the UE Rx signal at the UE. The UE may also comprise means for receiving, from a network entity, one or more round trip time (RTT) measurement (RTTM) signals on RTTM resources comprising downlink (DL) physical layer resources. Each RTTM signal may comprise an RTTM waveform. The UE may further comprise means for determining one or more RTT response (RTTR) payloads for one or more RTTR signals. Each RTTR signal may correspond to one or more of the received RTTM signals and may comprise an RTTR waveform and the RTTR payload. The UE may yet further comprise means for transmitting, to the network entity, the one or more RTT response (RTTR) signals on RTTR resources comprising uplink (UL) physical layer resources. For each RTTR signal, a transmission timing of the RTTR waveform may be determined based on the UE total GD, or the RTTR payload may be determined based on the UE total GD, or both.

An exemplary non-transitory computer-readable medium storing computer-executable instructions for a network entity is disclosed. The computer-executable instructions comprise one or more instructions causing the network entity to determine a network total group delay (GD) comprising a network transmission GD and a network reception GD. The network transmission GD may indicate a time interval between a measured transmission time of a network Tx signal transmitted from the network entity and an actual transmission time of the network Tx signal leaving the network entity. The network reception GD may indicate a time interval between an actual arrival time of a network Rx signal at the network entity and a measured arrival time of the network Rx signal at the network entity. The computer-executable instructions also comprise one or more instructions causing the network entity to transmit, to a user equipment (UE), one or more round trip time (RTT) measurement (RTTM) signals on RTTM resources comprising downlink (DL) physical layer resources. Each RTTM signal may comprise an RTTM waveform. The computer-executable instructions further comprise one or more instructions causing the network entity to receive, from the UE, one or more RTT response (RTTR) signals on RTTR resources comprising uplink (UL) physical layer resources. Each RTTR signal may correspond to one or more of the transmitted RTTM signals and may comprise an RTTR waveform and an RTTR payload. The computer-executable instructions yet further comprise one or more instructions causing the network entity to determine an RTT between the UE and the network entity based on the RTTM signal(s), the RTTR signal(s), and the network total GD.

An exemplary non-transitory computer-readable medium storing computer-executable instructions for a user equipment (UE) is disclosed. The computer-executable instructions comprise one or more instructions causing the UE to determine a UE group delay (GD) comprising a UE transmission GD and a UE reception GD. The UE transmission GD may indicate a time interval between a measured transmission time of a UE Tx signal transmitted from the UE and an actual transmission time of the UE Tx signal leaving the UE. The UE reception GD may indicate a time interval between an actual arrival time of a UE Rx signal at the UE and a measured arrival time of the UE Rx signal at the UE. The computer-executable instructions also comprise one or more instructions causing the UE to receive, from a network entity, one or more round trip time (RTT) measurement (RTTM) signals on RTTM resources comprising downlink (DL) physical layer resources. Each RTTM signal may comprise an RTTM waveform. The computer-executable instructions further comprise one or more instructions causing the UE to determine one or more RTT response (RTTR) payloads for one or more RTTR signals. Each RTTR signal may correspond to one or more of the received RTTM signals and may comprise an RTTR waveform and the RTTR payload. The computer-executable instructions yet further comprise one or more instructions causing the UE to transmit, to the network entity, the one or more RTT response (RTTR) signals on RTTR resources comprising uplink (UL) physical layer resources. For each RTTR signal, a transmission timing of the RTTR waveform may be determined based on the UE total GD, or the RTTR payload may be determined based on the UE total GD, or both.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1A:
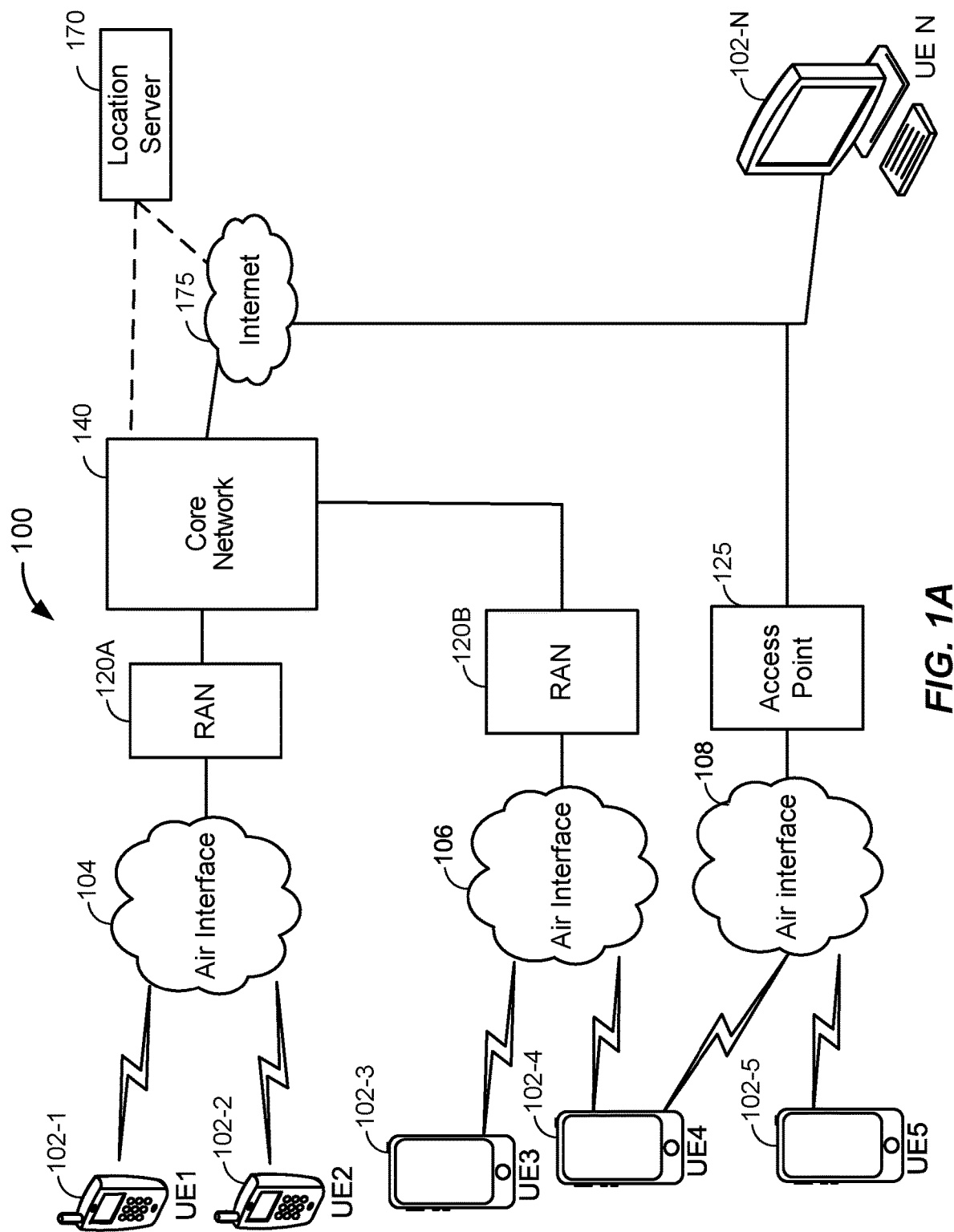
FIG. 1A illustrates a high-level system architecture of a wireless communications system in accordance with various aspects of the disclosure.

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (UE) and "base station" are not intended to be specific or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1A illustrates a high-level system architecture of a wireless communications system 100 in accordance with an aspect of the disclosure. The wireless communications system 100 contains UEs 1 to N (referenced as 102-1 to 102-N). The UEs 102-1 to 102-N can include cellular telephones, personal digital assistant (PDAs), pagers, a laptop computer, a tablet computer, a desktop computer, and so on. For example, in FIG. 1A, UE 102-1 and UE 102-2 are illustrated as cellular feature phones, UEs 102-3, 102-4, and 102-5 are illustrated as cellular touchscreen phones, or "smartphones," and UE 102-N is illustrated as a desktop computer, or personal computer (often referred to as a "PC"). Although only six UEs 102 are shown in FIG. 1A, the number of UEs 102 in wireless communications system 100 may be in the hundreds, thousands, or millions (e.g., N may be any number up to or greater than one million).

Referring to FIG. 1A, UEs 102-1 to 102-N are configured to communicate with one or more access networks (e.g., the RANs 120A and 120B, the access point 125, etc.) over a physical communications interface or layer, shown in FIG. 1A as air interfaces 104, 106, and 108 and/or a direct wired connection. The air interfaces 104 and 106 can comply with a given cellular communications protocol (e.g., Code Division Multiple Access (CDMA), Evolution-Data Optimized (E-VDO), Enhanced High Rate Packet Data (eHRPD), Global System for Mobile communications (GSM), Wideband CDMA (W-CDMA), LTE, LTE-U, 5G NR, etc.), while the air interface 108 can comply with a Wireless Local Area Network (WLAN) protocol (e.g., IEEE 802.11). Both RAN 120A and 120B may include a plurality of access points that serve UEs over air interfaces, such as the air interfaces 104 and 106. The access points in the RAN 120A and 120B can be referred to as access nodes (ANs), access points (APs), base stations (BSs), Node Bs, eNodeBs, gNodeBs, and so on. For example, an eNodeB (also referred to as an evolved NodeB) is typically a base station that supports wireless access by UEs 102 according to the LTE wireless interface defined by 3GPP. As another example, a gNodeB, or gNB, is typically a base station that supports wireless access by UEs 102 according to the 5G NR wireless interface. These access points can be terrestrial access points (or ground stations), or satellite access points.

Both RANs 120A and 120B are configured to connect to a core network 140 that can perform a variety of functions, including routing and connecting circuit switched (CS) calls between UEs 102 served by the RAN 120A/120B and other UEs 102 served by the RAN 120A/120B or UEs served by a different RAN altogether, and can also mediate an exchange of packet-switched (PS) data with external networks such as Internet 175 and external clients and servers.

The Internet 175 includes a number of routing agents and processing agents (not shown in FIG. 1A for the sake of convenience). In FIG. 1A, UE 102-N is shown as connecting to the Internet 175 directly (i.e., separate from the core network 140, such as over an Ethernet connection of WiFi or 802.11-based network). The Internet 175 can thereby function to route and connect packet-switched data communications between UE 102-N and UEs 102-1 to 102-5 via the core network 140.

Also shown in FIG. 1A is the access point 125 that is separate from the RANs 120A and 120B. The access point 125 may be connected to the Internet 175 independently of the core network 140 (e.g., via an optical communication system such as FiOS, a cable modem, etc.). The air interface 108 may serve UE 102-4 or UE 102-5 over a local wireless connection, such as IEEE 802.11 in an example. UE 102-N is shown as a desktop computer with a wired connection to the Internet 175, such as a direct connection to a modem or router, which can correspond to the access point 125 itself in an example (e.g., for a WiFi router with both wired and wireless connectivity).

In FIG. 1A, a location server 170 is shown as connected to the Internet 175 and the core network 140. The location server 170 can be implemented as a plurality of structurally separate servers, or alternately may each correspond to a single server. As will be described below in more detail, the location server 170 is configured to support one or more location services for UEs 102 that can connect to the location server 170 via the core network 140 and/or via the Internet 175.

An example of a protocol-specific implementation for the RANs 120A and 120B and the core network 140 is provided below with respect to FIG. 1B to help explain the wireless communications system 100 in more detail. In particular, the components of the RANs 120A and 120B and the core network 140 correspond to components associated with supporting packet-switched (PS) communications, whereby legacy circuit-switched (CS) components may also be present in these networks, but any legacy CS-specific components are not shown explicitly in FIG. 1B.

Figure 1B:
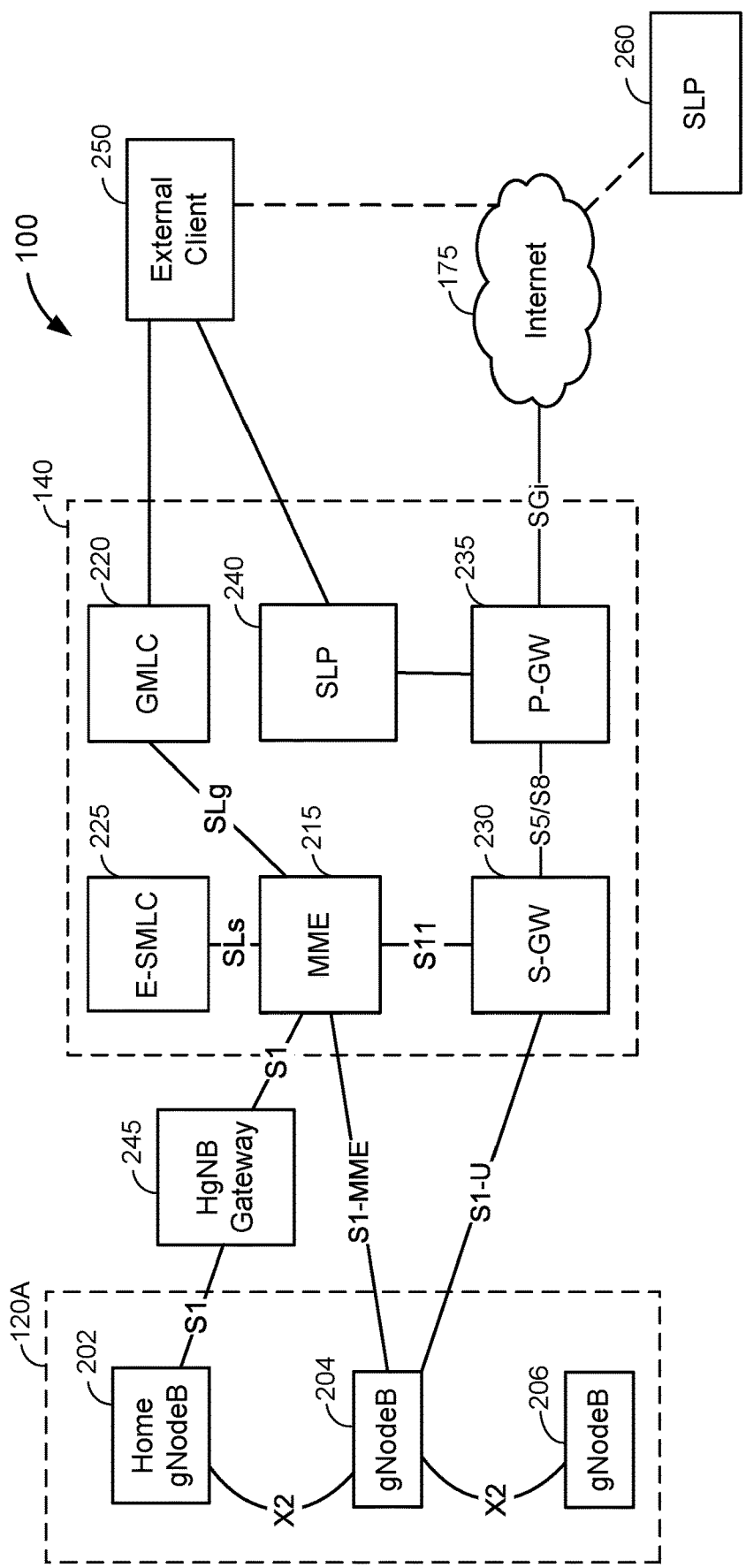
FIG. 1B illustrates an example configuration of radio access networks (RANs) and a packet-switched portion of a core network that is based on an LTE network in accordance with various aspects of the disclosure.

FIG. 1B illustrates an example configuration of a portion of the RAN 120A and a portion of the core network 140 based on a 5G NR network, in accordance with an aspect of the disclosure. Referring to FIG. 1B, RAN 120A is configured with a plurality of gNodeBs 202, 204, and 206. In the example of FIG. 1B, gNodeB 202 is shown as a Home gNodeB (HgNodeB) and interfaces with the RAN 120A via a HgNodeB gateway 245. The Home gNodeB 202 is an example of a "small cell base station." The term "small cell" generally refers to a class of low-powered base stations that may include or be otherwise referred to as femto cells, pico cells, micro cells, home base stations, Wi-Fi APs, other small coverage area APs, etc. A small cell may be deployed to supplement macro cell (e.g., gNodeB) coverage and/or increase network capacity. A small cell may provide wireless coverage indoors such as within a house, office, a portion of a large building, a portion of a convention center, shopping mall, etc. A small cell may instead or in addition provide wireless coverage outdoors such as over an area covering part of a block or a few blocks within a neighborhood. Small cells may communicate using unlicensed frequency bands, as opposed to macro cells, which may typically communicate using licensed frequency bands.

In FIG. 1B, the core network 140 includes an Evolved Serving Mobile Location Center (E-SMLC) 225, a Mobility Management Entity (MME) 215, a Gateway Mobile Location Center (GMLC) 220, a Serving Gateway (S-GW) 230, a Packet Data Network Gateway (P-GW) 235, and a Secure User Plane Location (SUPL) Location Platform (SLP) 240. In the example of FIG. 1B, the location server 170 in FIG. 1A may correspond to one or more of the E-SMLC 225, the GMLC 220, or the SLP 240.

Network interfaces between the components of the core network 140, the RAN 120A, and the Internet 175 are illustrated in FIG. 1B and are defined in Table 1 (below) as follows:

TABLE 1

Core Network Connection Definitions

| Network Interface | Description |
| --- | --- |
| S1-MME | Reference point for the control plane protocol between RAN 120A and MME 215. |
| S1-U | Reference point between RAN 120A and S-GW 230 for the per bearer user plane tunneling and inter-gNodeB path switching during handover. |
| S5 | Provides user plane tunneling and tunnel management between S-GW 230 and P-GW 235. It is used for S-GW relocation due to UE mobility and if the S-GW 230 needs to connect to a non-collocated P-GW for the required PDN connectivity. |
| S8 | Inter-PLMN reference point providing user and control plane between the S-GW 230 in a Visited Public Land Mobile Network (VPLMN) and the P-GW 235 in a Home Public Land Mobile Network (HPLMN). S8 is the inter-PLMN variant of S5. P-GW 235 is shown as being in the same Public Land Mobile Network (PLMN) as S-GW 230 in FIG. 1B so only the S5 interface may apply in FIG. 1B. But the S8 interface would apply if P-GW 235 was located in a different PLMN. |
| S11 | Reference point between MME 215 and S-GW 230. |
| SGi | Reference point between the P-GW 235 and a packet data network (PDN), shown in FIG. 1B as the Internet 175. The PDN may be an operator external public or private packet data network or an intra-operator packet data network (e.g., for provision of IMS services). This reference point corresponds to Gi for 3GPP accesses. |
| X2 | Reference point between two different gNodeBs used for UE handoffs. |

A high-level description of some of the components shown in the RANs 120A and 120B and the core network 140 of FIG. 1B is now provided. However, these components are each well-known in the art from various 3GPP and Open Mobile Alliance (OMA) Technical Specifications (TSs), and the description contained herein is not intended to be an exhaustive description of all functionalities performed by these components.

Referring to FIG. 1B, the MME 215 is configured to manage the control plane signaling for the Evolved Packet System (EPS). MME functions include: Non-Access Stratum (NAS) signaling, NAS signaling security, Mobility management for UEs 102 including support for inter-RAN and intra-RAN handovers, P-GW and S-GW selection, and MME selection for handovers with a change of MME.

The S-GW 230 is the gateway that terminates the interface toward the RAN 120A. For each UE 102 attached to the core network 140 for a 5G-based system, at a given point of time, there can be a single S-GW 230. The functions of the S-GW 230 include: serving as a mobility anchor point, packet routing and forwarding, and setting the Differentiated Services Code Point (DSCP) based on a Quality of Service (QoS) Class Identifier (QCI) of an associated EPS bearer.

The P-GW 235 is the gateway that terminates the SGi interface toward the Packet Data Network (PDN), e.g., the Internet 175. If a UE 102 is accessing multiple PDNs, there may be more than one P-GW 235 for that UE 102. P-GW 235 functions include: providing PDN connectivity to UEs 102, UE IP address allocation, setting the DSCP based on the QCI of the associated EPS bearer, accounting for inter operator charging, uplink (UL) and downlink (DL) bearer binding, and UL bearer binding verification.

As further illustrated in FIG. 1B, an external client 250 may be connected to the core network 140 via the GMLC 220 and/or the SLP 240. The external client 250 may optionally be connected to the core network 140 and/or the SLP 260 via the Internet 175. The external client 250 may be a server, a web server, or a user device, such as a personal computer, a UE, etc.

The HgNodeB Gateway 245 in FIG. 1B may be used to support connection of small cells and/or HgNodeBs, such as HgNodeB 202. HgNodeB Gateway 245 may include or be connected to a Security Gateway (not shown in FIG. 1B). The Security Gateway may help authenticate the small cells and/or HgNodeBs, such as HgNodeB 202, and/or may enable secure communication between the small cells and/or HgNodeBs, such as HgNodeB 202, and other network entities, such as MME 215. The HgNodeB Gateway 245 may perform protocol relaying and conversion in order to allow small cells and/or HgNodeBs, such as HgNodeB 202, to communicate with other entities, such as MME 215.

The GMLC 220 may be a location server that enables an external client, such as an external client 250, to request and obtain a location estimate for a UE 102. Functions of the GMLC 220 may include authenticating and authorizing the external client 250 and requesting and obtaining a location estimate for a UE 102 from the MME 215 on behalf of the external client 250.

The E-SMLC 225 may process positioning requests, e.g., from the MME 215. The E-SMLC 225 may communicate with the UE 102 to request reference signal timing difference (RSTD) measurements. From the received RSTD measurements, the E-SMLC 225 estimates the position of the UE 102 and sends the results to the MME 215, which can forward the results to the external client 250.

The SLP 240 and SLP 260 may support the Secure User Plane Location (SUPL) location solution defined by the OMA, which is a user plane (UP) location solution. With a UP location solution, signaling to initiate and perform positioning of a UE 102 may be transferred using interfaces and protocols that support transfer of data (and possibly voice and other media). With the SUPL UP location solution, the location server may include or take the form of a SUPL Location Platform (SLP), such as SLP 240 or SLP 260. In FIG. 1B, either or both of SLPs 240 and 260 may be a Home SLP (H-SLP) for one or more of UEs 102, an emergency SLP (E-SLP), and/or a Discovered SLP (D-SLP). The functions of the SLPs 240 and 260 may include some or all of the functions described previously for both the E-SMLC 225 and the GMLC 220.

Figure 2:
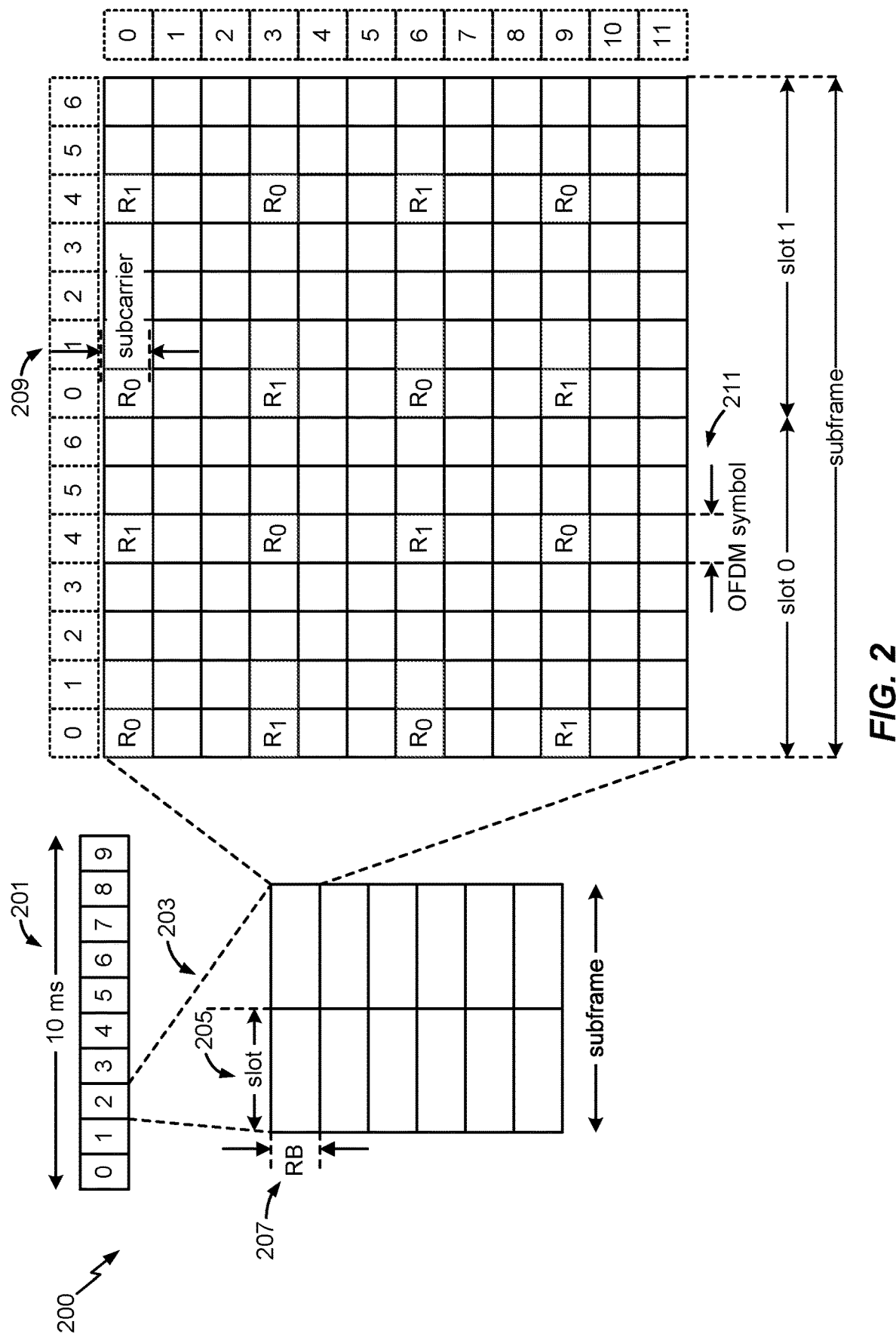
FIG. 2 illustrates a diagram of an example of a frame structure for use in a wireless telecommunications system in accordance with various aspects of the disclosure.

Time intervals of a communications resource in LTE or 5G NR may be organized according to radio frames. FIG. 2 illustrates an example of a downlink radio frame structure 200 according to an aspect of the disclosure. However, as those skilled in the art will readily appreciate, the frame structure for any particular application may be different depending on any number of factors. In this example, a frame 201 (10 ms) is divided into 10 equally sized sub-frames 203 (1 ms). Each sub-frame 203 includes two consecutive time slots 205 (0.5 ms).

A resource grid may be used to represent two time slots 205, each time slot 205 including a resource block 207. The resource grid is divided into multiple resource elements. In LTE, and in some cases 5G NR, a resource block contains 12 consecutive subcarriers 209 in the frequency domain and, for a normal cyclic prefix in each OFDM symbol 211, 7 consecutive OFDM symbols 211 in the time domain, or 84 resource elements. Some of the resource elements, as indicated as $R_0$ and $R_1$, include a downlink reference signal (DL-RS). The DL-RS include Cell-specific RS (CRS) (also sometimes called common RS) and UE-specific RS (UE-RS). UE-RS are transmitted only on the resource blocks upon which the corresponding physical downlink shared channel (PDSCH) is mapped. The number of bits carried by each resource element depends on the modulation scheme.

Thus, the more resource blocks 207 that a UE receives and the higher the modulation scheme, the higher the data rate for the UE.

LTE, and in some cases 5G NR, utilizes OFDM on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

Figure 3:
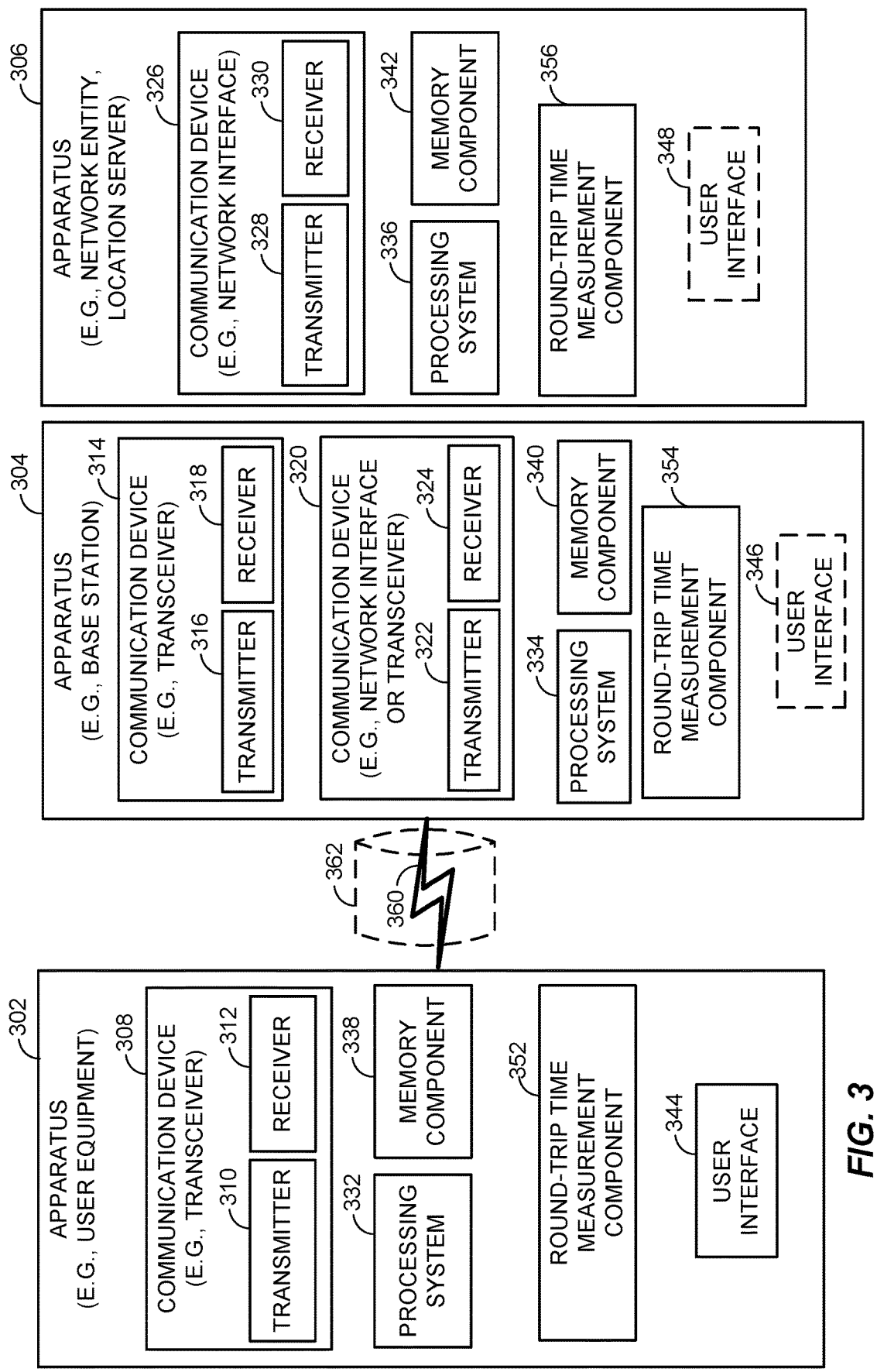
FIG. 3 illustrates a simplified block diagram of several sample aspects of components that may be employed in wireless communication nodes and configured to support communication in accordance with various aspects of the disclosure.

FIG. 3 illustrates several sample components (represented by corresponding blocks) that may be incorporated into an apparatus 302, an apparatus 304, and an apparatus 306 (corresponding to, for example, a UE, a base station (e.g., a gNodeB), and a network entity or location server, respectively) to support the operations as disclosed herein. As an example, the apparatus 302 may correspond to a UE 102, the apparatus 304 may correspond to any of gNodeBs 202-206, and the apparatus 306 may correspond to the E-SMLC 225, SLP 240, SLP 260, or GMLC 220. It will be appreciated that the components may be implemented in different types of apparatuses in different implementations (e.g., in an ASIC, in a System-on-Chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 302 and the apparatus 304 each include at least one wireless communication device (represented by the communication devices 308 and 314) for communicating with other nodes via at least one designated RAT (e.g., LTE, 5G NR). Each communication device 308 includes at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Each communication device 314 includes at least one transmitter (represented by the transmitter 316) for transmitting signals (e.g., messages, indications, information, pilots, and so on) and at least one receiver (represented by the receiver 318) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include a plurality of antennas, such as an antenna array, that permits the respective apparatus to perform transmit "beamforming," as described further herein. Similarly, a receiver may include a plurality of antennas, such as an antenna array, that permits the respective apparatus to perform receive beamforming, as described further herein. In an aspect, the transmitter and receiver may share the same plurality of antennas, such that the respective apparatus can only receive or transmit at a given time, not both at the same time. A wireless communication device (e.g., one of multiple wireless communication devices) of the apparatus 304 may also comprise a Network Listen Module (NLM) or the like for performing various measurements.

The apparatus 304 and the apparatus 306 include at least one communication device (represented by the communication device 320 and the communication device 326) for communicating with other nodes. For example, the communication device 326 may comprise a network interface (e.g., one or more network access ports) that is configured to communicate with one or more network entities via a wire-based or wireless backhaul connection. In some aspects, the communication device 326 may be implemented as a transceiver configured to support wire-based or wireless signal communication. This communication may involve, for example, sending and receiving: messages, parameters, or other types of information. Accordingly, in the example of FIG. 3, the communication device 326 is shown as comprising a transmitter 328 and a receiver 330 (e.g., network access ports for transmitting and receiving). Similarly, the communication device 320 may comprise a network interface that is configured to communicate with one or more network entities via a wire-based or wireless backhaul. As with the communication device 326, the communication device 320 is shown as comprising a transmitter 322 and a receiver 324.

The apparatuses 302, 304, and 306 also include other components that may be used in conjunction with the operations as disclosed herein. The apparatus 302 includes a processing system 332 for providing functionality relating to, for example, RTT measurements in a licensed or unlicensed frequency band as disclosed herein and for providing other processing functionality. The apparatus 304 includes a processing system 334 for providing functionality relating to, for example, RTT measurements in a licensed or unlicensed frequency band as disclosed herein and for providing other processing functionality. The apparatus 306 includes a processing system 336 for providing functionality relating to, for example, RTT measurements in a licensed or unlicensed frequency band as disclosed herein and for providing other processing functionality. In an aspect, the processing systems 332, 334, and 336 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory components 338, 340, and 342 (e.g., each including a memory device), respectively, for maintaining information (e.g., information indicative of reserved resources, thresholds, parameters, and so on). In addition, the apparatuses 302, 304, and 306 include user interface devices 344, 346, and 348, respectively, for providing indications (e.g., audible and/or visual indications) to a user and/or for receiving user input (e.g., upon user actuation of a sensing device such a keypad, a touch screen, a microphone, and so on).

For convenience, the apparatuses 302, 304, and/or 306 are shown in FIG. 3 as including various components that may be configured according to the various examples described herein. It will be appreciated, however, that the illustrated blocks may have different functionality in different designs.

The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, and 344 may be implemented by processor and memory component(s) of the apparatus 302 (e.g., by execution of appropriate code and/or by appropriate configuration of processor components). Similarly, some or all of the functionality represented by blocks 314, 320, 334, 340, and 346 may be implemented by processor and memory component(s) of the apparatus 304 (e.g., by execution of appropriate code and/or by appropriate configuration of processor components). Also, some or all of the functionality represented by blocks 326, 336, 342, and 348 may be implemented by processor and memory component(s) of the apparatus 306 (e.g., by execution of appropriate code and/or by appropriate configuration of processor components).

In an aspect, the apparatus 304 may correspond to a "small cell" or a Home gNodeB, such as Home gNodeB 202 in FIG. 1B. The apparatus 302 may transmit and receive messages via a wireless link 360 with the apparatus 304, the messages including information related to various types of communication (e.g., voice, data, multimedia services, associated control signaling, etc.). The wireless link 360 may operate over a communication medium of interest, shown by way of example in FIG. 3 as the medium 362, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the apparatus 304 and the apparatus 302 for the medium 362.

As a particular example, the medium 362 may correspond to at least a portion of an unlicensed frequency band shared with another RAN and/or other APs and UEs. In general, the apparatus 302 and the apparatus 304 may operate via the wireless link 360 according to one or more radio access types, such as LTE, LTE-U, or 5G NR, depending on the network in which they are deployed. These networks may include, for example, different variants of CDMA networks (e.g., LTE networks, 5G NR networks, etc.), TDMA networks, FDMA networks, Orthogonal FDMA (OFDMA) networks, Single-Carrier FDMA (SC-FDMA) networks, and so on. Although different licensed frequency bands have been reserved for wireless communications (e.g., by a government entity such as the Federal Communications Commission (FCC) in the United States), certain communication networks, in particular those employing small cell base stations, have extended operation into unlicensed frequency bands, such as the Unlicensed National Information Infrastructure (U-NII) band used by WLAN technologies, most notably IEEE 802.11x WLAN technologies generally referred to as "Wi-Fi," and LTE in unlicensed spectrum technologies generally referred to as "LTE-U" or "MuLTE-Fire."

Apparatus 302 may also include an RTT measurement component 352 that may be used to obtain location related measurements of signals (e.g., RTT or other signals) transmitted by a base station or AP (e.g., any of gNodeBs 202-206) according to techniques described herein. Location related measurements may include measurements of signal propagation time or RTT between a UE 102 and a base station or AP, such as any of gNodeBs 202-206.

Apparatus 304 and 306 may each include RTT measurement component 354 and 356, respectively, which may be used to determine a location estimate for a UE 102 (e.g., apparatus 302), according to techniques described herein, based on location related measurements provided by the UE 102 and/or by a base station or AP, such as any of gNodeBs 202-206. Location related measurements obtained by the UE 102 may include measurements of signal propagation time or RTT between a UE 102 and a base station or AP, such as any of gNodeBs 202-206. Location related measurements obtained by any of gNodeBs 202-206 (e.g., apparatus 304) may include measurements of signal propagation time or RTT between the UE 102 and a base station or AP, such as any of gNodeBs 202-206.

Figure 4:
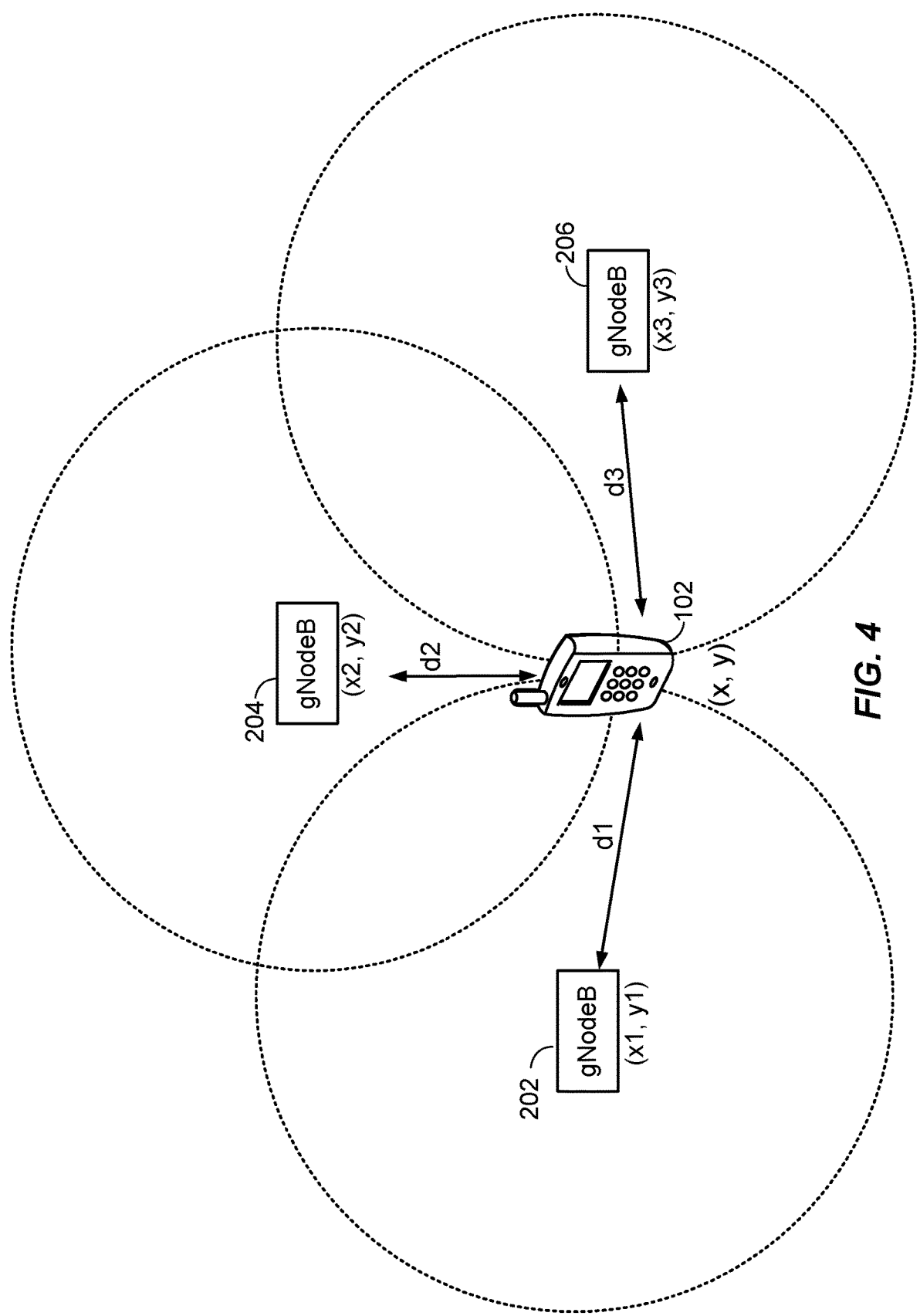
FIG. 4 illustrates a diagram of an exemplary technique for determining a position of a mobile station using information obtained from a plurality of base stations in accordance with various aspects of the disclosure.

A simplified environment is shown in FIG. 4 for illustrating an exemplary technique for determining a position of a UE 102. The UE 102 may communicate wirelessly with a plurality of gNodeBs 202-206 using radio frequency (RF) signals and standardized protocols for the modulation of the RF signals and the exchanging of information packets. By extracting different types of information from the exchanged signals, and utilizing the layout of the network (i.e., the network geometry) the UE 102 or any of the gNodeBs 202-206 may determine the UE 102's position in a predefined reference coordinate system. As shown in FIG. 4, the position (x, y) of the UE 102 may be specified using a two-dimensional coordinate system; however, the aspects disclosed herein are not so limited, and may also be applicable to determining positions using a three-dimensional coordinate system, if the extra dimension is desired. Additionally, while three gNodeBs 202-206 are shown in FIG. 4, aspects may utilize additional gNodeBs.

If the UE 102 is to determine its position (x, y), the UE 102 may first need to determine the network geometry. The network geometry can include the positions of each of the gNodeBs 202-206 in a reference coordinate system (($x_k$, $y_k$), where k=1, 2, 3). The network geometry may be provided to the UE 102 in any manner, such as, for example, providing this information in beacon signals, providing the information using a dedicated server external on an external network, providing the information using uniform resource identifiers, providing the information through base station almanac (BSA), etc.

In determining the position of the UE 102, whether by the UE 102 (UE-based) or by the network (UE-assisted), a distance ($d_k$, where k=1, 2, 3) of the UE 102 to each of the gNodeBs 202-206 is determined. As will be described in more detail below, there are a number of different approaches for estimating these distances ($d_k$) by exploiting different characteristics of the RF signals exchanged between the UE 102 and gNodeBs 202-206. Such characteristics may include, as will be discussed below, the round trip propagation time of the signals, and/or the strength of the signals (RSSI).

In other aspects, the distances ($d_k$) may in part be determined or refined using other sources of information that are not associated with the gNodeBs 202-206. For example, other positioning systems, such as GPS, may be used to provide a rough estimate of $d_k$. (Note that it is likely that GPS may have insufficient signal in the anticipated operating environments (indoors, metropolitan, etc.) to provide a consistently accurate estimate of $d_k$. However GPS signals may be combined with other information to assist in the position determination process.) Other relative positioning devices may reside in the UE 102 which can be used as a basis to provide rough estimates of relative position and/or direction (e.g., on-board accelerometers).

Once each distance $d_k$ is determined, the UE 102's position (x, y) may be solved by using a variety of known geometric techniques, such as, for example, trilateration. From FIG. 4, it can be seen that the position of the UE 102 ideally lies at the intersection of the circles drawn using dotted lines. Each circle being defined by radius $d_k$ and center $(x_k, y_k)$, where k=1, 2, 3. In practice, the intersection of these circles may not lie at a single point due to the noise and other errors in the networking system.

Determining the distance between the UE 102 and each gNodeB 202-206 may involve exploiting time information of the RF signals. In an aspect, determining the RTT of signals exchanged between the UE 102 and a gNodeB 202-206 can be performed and converted to a distance ($d_k$). RTT techniques can measure the time between sending a data packet and receiving a response. These methods utilize calibration to remove any processing delays. In some environments, it may be assumed that the processing delays for the UE 102 and the gNodeBs 202-206 are the same. However, such an assumption may not be true in practice.

A position estimate (e.g., for a UE 102) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 5:
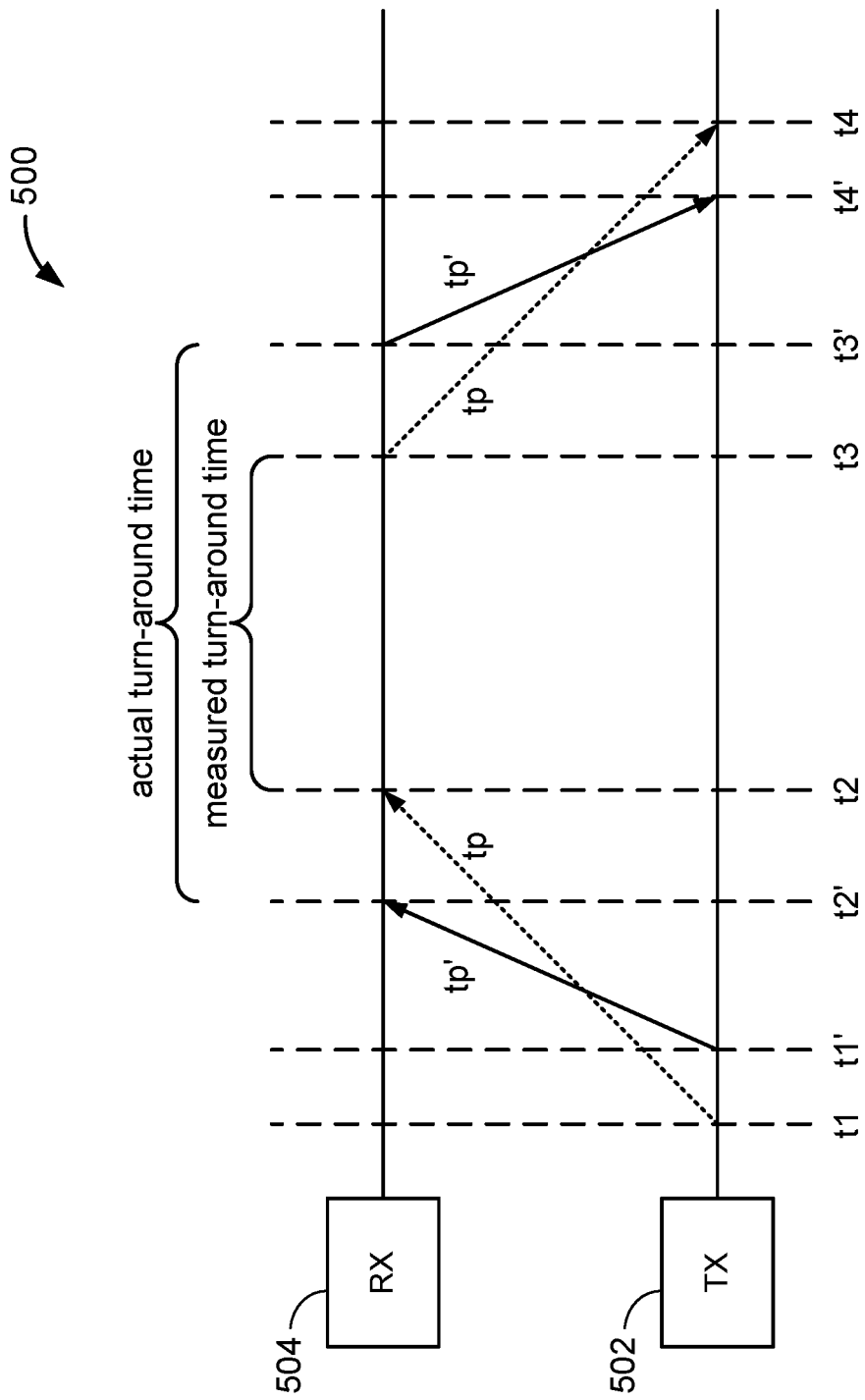
FIG. 5 illustrates a diagram showing exemplary timings within an RTT occurring during a wireless probe request and a response in accordance with various aspects of the disclosure.

FIG. 5 is a diagram 500 showing exemplary timings within an RTT occurring during a wireless probe request and a response between a transmitter 502 and a receiver 504. For a network centric (UE-assisted) RTT determination, the transmitter 502 may correspond to a network node (e.g., any of the gNodeBs 202-206) and the receiver 504 may correspond to the UE 102. For a UE centric RTT determination, the transmitter 502 may correspond to the UE 102 and the receiver 504 may correspond to the network node. In an aspect, the response may take the form of an acknowledgement packet (ACK); however, any type of response packet would be consistent with various aspects of the disclosure. For example, a Request to Send (RTS) transmit packet and/or Clear to Send (CTS) response packet may be suitable.

To measure the RTT between the transmitter 502 and the receiver 504, the transmitter 502 sends an RTT Measurement (RTTM) signal at time t1. After some propagation time tp, the receiver 504 measures the reception of the RTTM signal at time t2. The RTTM signal may include a waveform, and may also include a payload. The RTTM waveform allows the receiver 504 to measure the time t2. Subsequently, the receiver 504 takes some turn-around time A to process the received RTTM signal before sending an RTT Response (RTTR) signal at time t3. After the propagation time tp, the transmitter 502 measures the reception of the RTTR signal at time t4. The RTTR signal may include a waveform and a payload. The RTTR waveform allows the transmitter 502 to measure the time t4. Thus, the measured flight time or RTT may be calculated as the measured total time minus the measured turn-around time at the receiver 504, i.e., $$\text{measured RTT} = (t4-t1)-(t3-t2) \quad (1)$$

or equivalently as:

$$\text{measured RTT} = (t4-t1)+(t2-t3) \quad (1a)$$

Note that the UE measurement of (t3−t2) may equivalently be expressed in terms of UE Rx-Tx time difference, and similarly the network node measurement of (t4−t1) may equivalently be expressed in terms of a base station's (e.g., eNodeB, gNodeB, etc.) Rx-Tx time difference, for example, as defined in 3GPP TS 36.214. The UE's RTTR payload may include the UE's report of its Rx-Tx timing measurement, which may be sent to the base station and/or or to the positioning server (e.g., eSMLC, LMF, etc). As an aside, the UE may report $(T_{UE-Rx}-T_{UE-Tx})$ as the UE Rx-Tx time difference which is equivalent to reporting (t2−t3), in which instance, equation (1a) may be used. The base station may report to the positioning server its Rx-Tx timing measurement, or the sum of the Rx-Tx measurements of the base station and the UE (which equals the measured RTT). More generically, the receiver 504 (be it the UE or the base station) may report either its turn-around time (t3−t2) or its Rx-Tx time difference (t2−t3), and appropriate equation (1) or (1a) may be used.

In the discussion below, the receiver's measured (t3−t2) and actual (t3'−t2') turn-around times will be used and expressed in equations. However, unless specifically indicated otherwise, it is fully contemplated that instances of the receiver's turn-around times (measured (t3−t2) and/or actual (t3'−t2')) may be equivalently expressed with the receiver's Rx-Tx time differences (measured (t2−t3) and/or actual (t2'−t3')) with appropriate adjustments in the equations. Also in the discussion below, when it is indicated that the receiver reports its measured and/or actual turn-around times, it is contemplated that the receiver may report its measured and/or actual Rx-Tx time differences as alternatives or in addition to reporting the turn-around times.

As indicated, the times t1, t2, t3 and t4 are the times as measured by transmitter 502 and the receiver 504 in the digital domain. But in reality, the RTTM waveform actually leaves the transmitter 502 at time t1' and arrives at the receiver 502 at time t2'. Also, the RTTR waveform actually leaves the receiver 504 at time t3' and arrives at the transmitter 502 at time t4'. For ease of reference, the times t1 and t2 may respectively be referred to as measured RTTM transmit and arrival times, and the times t3 and t4 may respectively be referred to as measured RTTR transmit and arrival times. Analogously, the times t1' and t2' may respectively be referred to as actual RTTM transmit and arrival times, and the times t3' and t4' may respectively be referred to as actual RTTR transmit and arrival times.

The discrepancy between the measured and actual times is explained as follows. In wireless communications, a source device (or simply "source") transmits radio frequency (RF) signals to a destination device (or simply "destination"). In order to transmit a digital signal, the source performs a process to convert the digital signal onto radio frequency (RF) signals. For example, the source typically includes a digital-to-analog converter (DAC) to convert the digital signal into a baseband analog signal. The baseband signal is then upconverted in frequency into the RF signal, which is then transmitted by the antenna(s) of the source. The destination performs a reverse process to retrieve the original digital signal. For example, the RF signal arrives at the antenna(s) of the destination. The received RF signal is filtered (e.g., low pass, high pass, band pass). The filtered RF signal is amplified and downconverted into the baseband signal. The digital signal is recovered, e.g., by an analog-to-digital converter (ADC) at the destination device.

The process performed at the source to convert the digital signal onto the RF signal takes a finite amount of time, which will be generically referred to as "transmission group delay". The transmission group delay (GD) may be said to indicate an interval between the measured transmission time of a signal transmitted from the source, and the actual transmission time of the signal leaving the source. The reverse process performed at the destination to recover the digital signal also takes a finite amount of time, which will be generically referred to as "reception group delay". The reception GD may be said to indicate an interval between the actual arrival time of a signal at the destination and the measured arrival time of the signal. The measured transmission and reception times are times measured in the digital domain. The term "group-delay" is used to emphasize that the delay is caused by elements in the RF chain as described above, which may include filters, and may result in a delay that is a function of frequency. Although the term group-delay is used herein, it may also be simply referred to as "delay".

In FIG. 5, the transmitter 502 is the source of the RTTM signal, and the receiver 504 is the destination. In this instance, the interval (t1'−t1) represents the transmission GD of the transmitter 502, and the interval (t2−t2') represents the reception GD of the receiver 504. Regarding the RTTR signal, the receiver 504 is the source and the transmitter 502 is the destination. Then the interval (t3'−t3) represents the transmission GD of the receiver 504, and the interval (t4−t4') represents the reception GD of the transmitter 502.

In FIG. 5, it is seen that calculating the flight time or RTT using actual times t1', t2', t3' and t4' will be more accurate than calculating using the measured times t1, t2, t3 and t4 alone. Then if the transmission and reception GDs are known for both the transmitter 502 and the receiver 504, then a more accurate flight time or RTT may be calculated. More specifically, in FIG. 5, the actual RTT may be calculated as actual total time minus the actual turn-around time at the receiver, in other words, the actual RTT may be expressed as:

$$\text{actual RTT}=(t4'-t1')-(t3'-t2') \quad (2)$$

or $$\text{actual RTT}=(t4'-t1')+(t2'-t3') \quad (2a)$$

If the transmission and reception GDs are known for both the transmitter 502 and the receiver 504, then the actual RTT may be determined by subtracting all of the delays from the measured RTT as follows:

$$\text{actual RTT}=(t4-t1)-(t3-t2)-\Sigma(\text{delays}), \quad (3)$$

or $$\text{actual RTT}=(t4-t1)+(t2-t3)-\Sigma(\text{delays}), \quad (3a)$$

$$\Sigma(\text{delays})=(t1'-t1)+(t2-t2')+(t3'-t3)+(t4-t4') \quad (4)$$

In an aspect, when a device (e.g., the transmitter 502, the receiver 504) includes multiple antennas, it may be able to determine or otherwise estimate its own GDs. For example, assume that the device includes first and second antennas. The device then can use the first antenna to transmit a signal and use the second antenna to receive the same signal. The device then can measure the transmit time tt and the receive time tr. Then the total GD through both transmit and receive chains becomes (tr−tt−ts) where ts accounts for the separation between the first and second antennas. If the separation is negligible, then the total GD can be reduced to (tr−tt).

Note the total delay (tr−tt) accounts for sum of the transmission and reception GDs of the device. When translated to the transmitter 502:

$$(tr-tt)=(t1'-t1)+(t4-t4') \quad (5)$$

and when translated to the receiver 504:

$$(tr-tt)=(t2-t2')+(t3'-t3). \quad (6)$$

For convenience, the sum of the transmission and reception GDs at the transmitter 502 (represented in equation (5)) will be referred to as the "transmitter total group delay", and the sum of the transmission and reception GDs at the receiver 504 (represented in equation (6)) will be referred to as the "receiver total group delay". In short, the transmitter 502 can determine the transmitter total GD=−t1)+(t4−t4'), and the receiver 504 can determine the receiver total GD= (t2−t2')+(t3'−t3). It is then seen that the Σ(delays) may be expressed as:

$$\Sigma(\text{delays})=\text{transmitter total GD+receiver total GD} \quad (7).$$

It is recognized that the roles of the first and second antennas in the device mentioned above can be reversed. That is, the first and second antenna may be respectively used to receive and transmit an RF signal, and the resulting total GD (which may or may not be the same as the previous total GD) may be determined. Indeed, for any pair of transmitting antenna i and receiving antenna j, i≠j, i and j=1 . . . N, N being the number of antennas, the total GD (i,j) may be determined. Translating this to the transmitter 502, the transmitter total GD (i,j) may be determined for each pair of antennas i,j of the transmitter 502. Translating this to the receiver 504, the receiver total GD (i,j) may be determined for each pair of antennas i,j of the receiver 504.

If the device is able to communicate on multiple frequencies (e.g., a frequency division duplex (FDD) device that uses different frequencies for transmission and reception, or a device supporting carrier aggregation or multiple radio access technologies (RATs)), then the frequencies can be taken into account. That is total delay (i,j,k) may be determined for each ordered pair of antennas i,j (with i,j representing the transmit and receive antenna indices respectively) and frequency k, k=1 . . . K, K being the number of frequencies. The transmitter 502 then may determine the transmitter total GD(i,j,k) for each pair of antennas i,j of the transmitter 502 and frequency k. The receiver 504 may also determine the receiver total GD(i,j,k) for each pair of antennas i,j of the receiver 504 and frequency k.

Note that each GD(i,j,k)=txgd(i,k)+rxgd(j,k) where txgd (i,k) is the group delay for the transmit chain using the i-th antenna and rxgd(j,k) is the group delay for the receive chain using the j-th antenna. For each k, there are 2N variables txgd(i,k), rxgd(i,k) whereas there are N*(N−1) measurable values of GD(i,j,k) corresponding to the ordered (i,j) pairs where i≠j, with i,j representing respectively the transmit and receive antenna indices. Thus, if N>2, since N*(N−1)>2N, there are more equations than unknowns, allowing the individual delays txgd(i,k) and rxgd(j,k) to be determined if all of the total GD(i,j,k) are measured. For N=2, the individual delays txgd(i,k) and rxgd(j,k) may be estimated under an assumption or approximation that they are same for both antennas, i.e., independent of i,j.

This can be useful for FDD devices, which usually communicate with a receive frequency kR and transmit frequency kT kR, for which the total group delay of interest for RTT measurement is thus txgd(i,kT)+rxgd(j,kR). Since measurements GD(i,j,k) made using a receive antenna to receive the transmission from a transmit antenna on the same device are necessarily at the same frequency k, they do not directly yield the above-mentioned quantity of interest txgd(i,kT)+rxgd(j,kR). Nonetheless, they can be used to determine the individual values txgd(i,k) and rxgd(j,k), from which this quantity may then be computed.

Such an approach may require measuring the GD(i,j,k) for the (i,j) ordered pairs for both k=kT and k=kR, which in turn involves one or more of transmitting at frequency kR which differs from the usual transmit frequency kT, and likewise receiving at frequency kT which differs from the usual receive frequency kR. In this instance, an additional receiver module may be provided to receive at the transmit frequency kT, to enable determining txgd(i,kT). Likewise, an additional transmitter module may be provided to transmit at the receive frequency kR, to enable determining rxgd(j,kR).

Further, transmissions by the device at the receive frequency may interfere with reception by other devices at that same frequency. For example, assume that UE1 transmits at its receive frequency kR to measure rxgd(j,kR). If UE2 receives this transmission at frequency kR, it would be difficult for UE2 to receive its downlink transmissions from the base station at frequency kR, especially if UE2 is very close to UE1, in which case downlink reception may be completely jammed. An analogous situation can also happen at the gNBs, where an FDD gNB transmitting in its receive band creates interference to other gNBs attempting to receive signals from UEs they serve; the only difference being that the transmit and receive bands are now interchanged with respect to that of the UE.

These interferences can be avoided by scheduling calibration gaps wherein these interfering transmissions are allowed and the transmissions they would have interfered with are instead suspended. The occurrence (including duration, periodicity, etc.) of these gaps could be signaled by gNB to the UE, to allow UE to perform group delay calibration for FDD. A base station could also perform similar calibration by coordinating with its neighboring base stations, for example, over X2 or Xn interface, to schedule interference-free calibration gaps, which may be transparent to UEs (i.e., the UEs are not scheduled on uplink, and may be unaware that the reason they are not scheduled is to allow neighboring gNBs to transmit on the uplink frequency).

Alternatively or in addition thereto, if the base stations are sufficiently separated from each other, as is usually the case, they may perform their calibration transmissions at low enough power to avoid the interference. This may be feasible since the receiver for these transmissions is physically very close, being within the base station itself. Note that such calibration gaps may be necessary only for devices that include the additional transmitter transmitting at the receive frequency, needed to make use of them. Hence the presence of this transmitter may be indicated, for example, as a UE capability. Similarly, the presence of the additional receiver for the transmit frequency may be indicated, for example, as a UE capability. A UE may have one or both of these capabilities. If only one of them is supported, the UE may be able to compensate for a part of its group delay (eg, only the txgd(i,kT) or only the rxgd(j,kR) but not both), which would limit the accuracy of its RTT estimate.

Since the network node (e.g., any of the gNodeBs 202-206) can be the transmitter 502 or the receiver 504, terms "network transmission group delay" (generically denoted by txgd(i,k) above, now particularized to refer to network node) and "network reception group delay" (generically denoted by rxgd(i,k) above, now particularized to refer to network node) will be used for convenience to refer to transmission and reception delays occurring at the network node. That is, the network transmission GD indicates the time interval between a measured transmission time of a signal (e.g., measured RTTM transmit time) and the actual transmission time of the signal (e.g., actual RTTM transmit time). Also, the network reception GD indicates the time interval between an actual arrival time of a signal (e.g., actual RTTR arrival time) and the measured arrival time of the signal (e.g., measured RTTR arrival time). The term "network total group delay" will be used to refer to the sum of the network transmission and reception GDs, i.e.:

$$\text{network total GD}=\text{network transmission GD}+\text{network reception GD} \quad (8)$$

Since the UE 102 can also be the transmitter 502 or the receiver 504, terms "UE transmission group delay" (generically denoted by txgd(i,k) above, now particularized to refer to UE node) and "UE reception group delay" (generically denoted by rxgd(i,k) above, now particularized to refer to UE node) will be used for convenience to refer to transmission and reception delays occurring at the UE. That is, the UE transmission GD indicates the time interval between a measured transmission time of a signal (e.g., measured RTTR transmit time) and the actual transmission time of the signal (e.g., actual RTTR transmit time). Also, the UE reception GD indicates the time interval between an actual arrival time of a signal (e.g., actual RTTM arrival time) and the measured arrival time of the signal (e.g., measured RTTM arrival time). The term "UE total group delay" will be used to refer to the sum of the UE transmission and reception GDs, i.e.:

$$\text{UE total GD}=\text{UE transmission GD}+\text{UE reception GD} \quad (9)$$

Then the actual round trip time between the network node and the UE may be calculated as the measured total time minus the measured turn-around time at the receiver minus the delays at the network node and the UE. That is:

$$\text{actual RTT}=(t4-t1)-(t3-t2)-(\text{network total GD}+\text{UE total GD}) \quad (10)$$

or $$\text{actual RTT}=(t4-t1)+(t2-t3)-(\text{network total GD}+\text{UE total GD}) \quad (10a)$$

From equations (10), (10a), it can be readily deduced that an accurate RTT may be determined when the total GDs of the network and the UE are known. Also, note that since the receiver is aware of its own total GD, it can readily calculate the actual turn-around time from the measured turn-around time. That is, if the UE is the receiver, $$(t3'-t2')=(t3-t2)+\text{UE total GD} \quad (11)$$

or $$(t2'-t3')=(t2-t3)-\text{UE total GD} \quad (11a)$$

Equation (11) or (11a) can be rearranged as:

$$(t3-t2)=(t3'-t2')-\text{UE total GD} \quad (12)$$

or $$(t2-t3)=(t2'-t3')+\text{UE total GD} \quad (12a).$$

Then equation (10), (10a) may be rewritten as:

$$\text{actual RTT}=(t4-t1)-(t3'-t2')-\text{network total GD} \quad (13)$$

or $$\text{actual RTT}=(t4-t1)+(t2'-t3')-\text{network total GD} \quad (13a).$$

Equations (13), (13a) indicate that as long as the UE (or generically the receiver 504) reports back the actual turn-around time (t3'-t2') and/or the UE Rx-Tx time difference (t2'-t3') in the RTTR payload, the network node (or generically the transmitter 502) may accurately calculate the RTT without having to be apprised of the specific value of the UE total GD. This means that each of the network node and the UE need to be only aware of its own total GD. Thus, in one aspect, the UE may explicitly include the actual UE turn-around time and/or the actual UE Rx-Tx time difference in the RTTR payload.

Alternatively, the UE may incorporate both the measured turn-around time (t3-t2) and the UE total GD in the RTTR signal. In an example implementation, the UE may include the measured turn-around time (t3-t2) and/or the measured time difference (t2-t3) in the RTTR payload. To indicate the UE total GD, the UE may alter the transmission time of the RTTR signal. For example, the network node can specify a timing advance (TA), which indicates how much the transmission timing should be advanced at the UE. The UE may transmit the RTTR signal at a timing offset from the specified TA by an amount corresponding to the UE total GD. The network node may then interpret the difference between the actual arrival time and the expected arrival time of the RTTR signal as corresponding to the UE total GD. Equation (10) and/or (10a) may then be used to calculate the RTT.

Accuracy of the position location methods may be affected by the characteristics of the RTTM and RTTR signals. For example, in some instances, it may be sufficient to have a coarse (e.g., within a cyclic prefix (CP) duration of Orthogonal Frequency-Division Multiplexing (OFDM) symbols) level time synchronization across gNodeBs. Coarse time-synchronization enables low-reuse of RTTMs, which mitigates intercell interference. Intercell interference mitigation ensures deep penetration of the RTTM signals, which enables multiple independent timing measurements across distinct gNodeBs, and hence more accurate positioning.

In a network-centric RTT estimation, the serving gNodeB (e.g., one of gNodeBs 202-206) instructs the UE (e.g., UE 102) to scan for/receive RTTM signals from one or more neighboring gNodeBs (one of more of gNodeBs 202-206). The one or more gNodeBs transmit the RTTM signals on low reuse resources, allocated by the network (e.g., location server 170). The UE records the arrival times of each RTTM(i) waveform, and transmits a common or individual RTTR signal(s) to the one or more gNodeBs (when instructed by its serving gNodeB).

An individual RTTR(i) signal directed at a particular gNodeB(i) may include, in its payload, the actual UE turn-around time (t3'-t2'). Alternatively, an individual RTTR (i) signal directed at a particular gNodeB(i) may include, in its payload, the measured UE turn-around time (t3-t2) and the transmission timing of the RTTR(i) signal may be altered.

The network may allocate low reuse resources for the UE to transmit the RTTR signals. Each gNodeB(i) that receives the RTTR signal records its RTTR arrival time t3. The gNodeB(i) can compute the RTT between the UE and itself according to equation (13). This computation may be performed either at the gNodeBs receiving the RTTR signal from the UE, or at a central location in the network (e.g., location server 170 or the serving gNodeB). The central location may have access to other information that helps improve the positioning accuracy, such as base station almanac (BSA), and other reports from UE and/or gNB (such as RSRP, AoA, AoD estimates, etc.). The RTTR payload carrying the UE turn-around time (actual and/or measured) could be addressed directly to the gNB or to the central location server via NAS containers within RRC messaging which may or may not be readable by the gNB.

Figure 6:
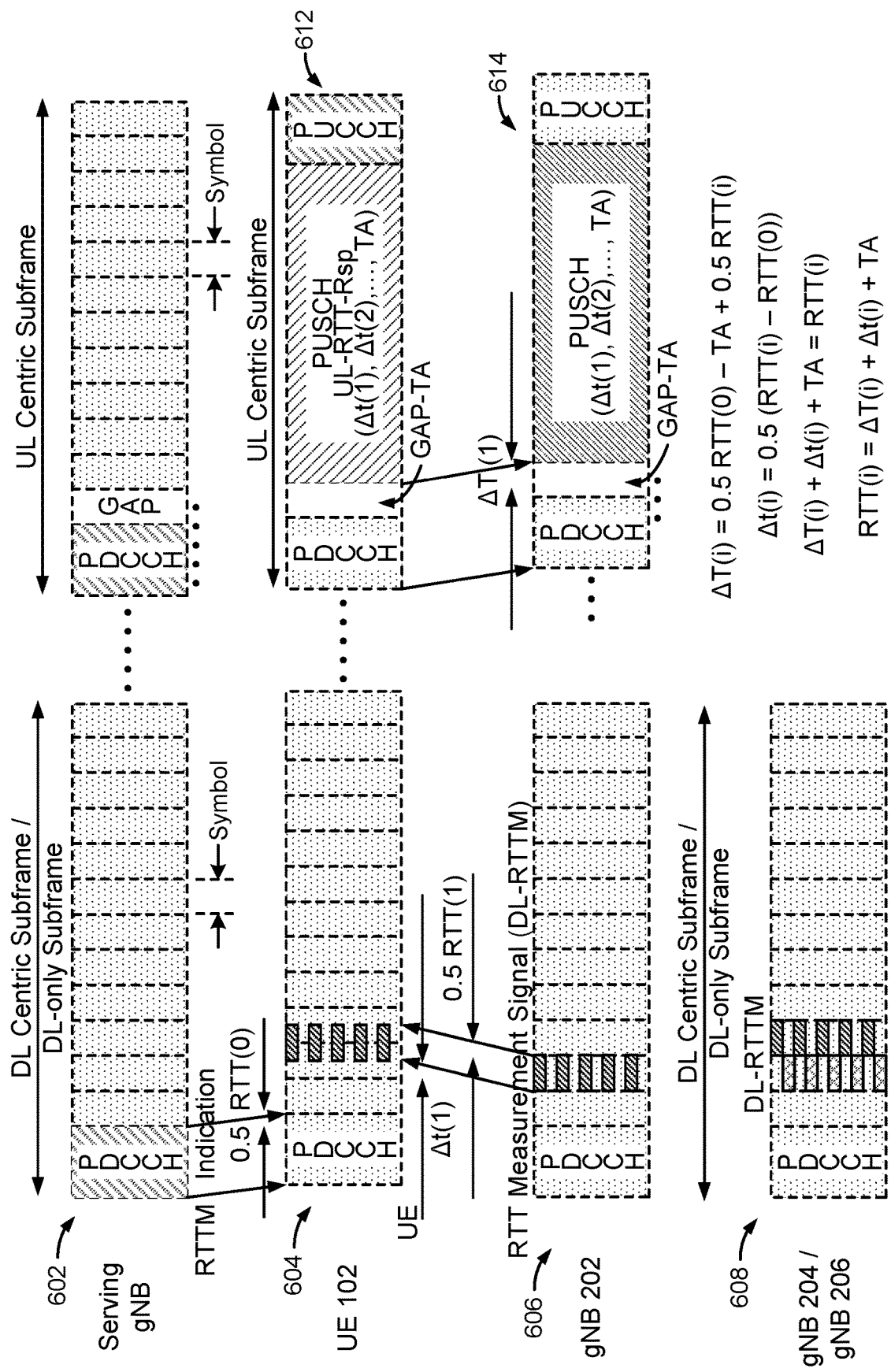
FIG. 6 illustrates an example of the network-centric RTT estimation in accordance with various aspects of the disclosure.

FIG. 6 illustrates an example of the network-centric RTT estimation technique according to an aspect of the disclosure. As shown in FIG. 6, on a downlink-centric/downlink-only subframe (at low duty-cycle) 602, the serving gNodeB sends a control signal (e.g., on the Physical Downlink Control Channel (PDCCH)) to the UE 102 during the first two symbol periods of the downlink subframe 602, indicating to the UE 102 that one or more gNodeBs (gNodeBs 202-206 in the example of FIG. 6) will be transmitting downlink RTT Measurement (RTTM) signal(s).

During the downlink subframes 606 and 608, gNodeBs 202-206 transmit RTTM signals at specified (by the network, e.g., location server 170, or the serving gNodeB) symbols of the downlink subframes 606 and 608, in a time division multiplexing (TDM) or frequency division multiplexing (FDM) fashion (as illustrated by the horizontal subdivisions of the respective symbols of the downlink subframes 606 and 608). Although not illustrated, the serving gNodeB may also transmit an RTTM signal during the downlink subframe 602. The RTTM signals transmitted by the gNodeBs 202-206 may be wideband signals to enable the UE 102 to make precise timing measurements. It can be that no other signals are transmitted in or around the symbols associated with the RTTM signals by any other gNodeB in the neighborhood. This results in low-reuse of the RTTM signals, interference avoidance, and deep penetration of the RTTM signals.

During the downlink subframe 604, the UE 102 measures the RTTM arrival times (e.g., t2) of each downlink RTTM transmitted by the gNodeBs 202-206 during the downlink subframes 606 and 608. The UE 102 can also calculate the actual arrival times (e.g., t2') of each downlink RTTM. The UE 102 derives its downlink subframe timing from the downlink signal received from the serving gNodeB on the PDCCH. That is, the UE 102 sets the start time of its PDCCH subframe to the time at which it received the downlink signal from the serving gNodeB.

The UE 102 is instructed to report its RTT measurements (e.g., the UE actual turn-around time (t3'-t2') and/or the UE measured turn-around time (t3'-t2')) on the Physical Uplink Shared Channel (PUSCH) during a subsequent uplink subframe, which it does during uplink subframe 612. Like the RTTM signals transmitted by the gNodeBs 202-206, the RTTR waveform transmitted by the UE 102 may be a wideband signal to enable the gNodeBs to make precise timing measurements of its arrival.

Each gNodeB in the UE 102's neighborhood (i.e., within communication range of the UE 102; gNodeBs 202-206 in the example of FIG. 6) receives the RTTR signal from the UE 102. In the example of FIG. 6, the gNodeB 202 receives the RTTR signal from the UE 102 during the uplink subframe 614. Each gNodeB(i) decodes the RTTR signal from the UE 102, and records the respective measured RTTR arrival time t4 and/or the respective actual RTTR arrival time t4'. Each gNodeB may then compute the actual RTT between the gNodeB and the UE 102 based on the actual RTTR arrival time t4', combined with the timing information in the payload. Alternatively, a gNodeB may then compute the actual RTT between the gNodeB and the UE 102 based on the actual RTTR arrival time t4', combined with the timing information in the payload and the timing offset of the RTTR signal.

A UE-centric RTT estimation is similar to the network-based method described above, except that the UE (e.g., UE 102) transmits RTTM signals (when instructed), which are received by multiple gNodeBs in the neighborhood of the UE. Each gNodeB(i) responds with an RTTR signal, including the measured turn-around time (t3−t2) or the actual turnaround time (t3'−t2') in the payload. The UE determines the actual RTTR arrival time t4 of the RTTR signal from each gNodeB(i), decodes the RTTR signal and extracts the gNodeB actual turn-around time (t3'−t2') included in the payload, and computes the RTT for the responding gNodeB (i). Alternatively, the UE extracts the gNodeB measured turn-around time (t3'−t2') included in the payload, determines the timing offset of the RTTR(i) signal, and computes the RTT for the responding gNodeB(i).

Figure 7:
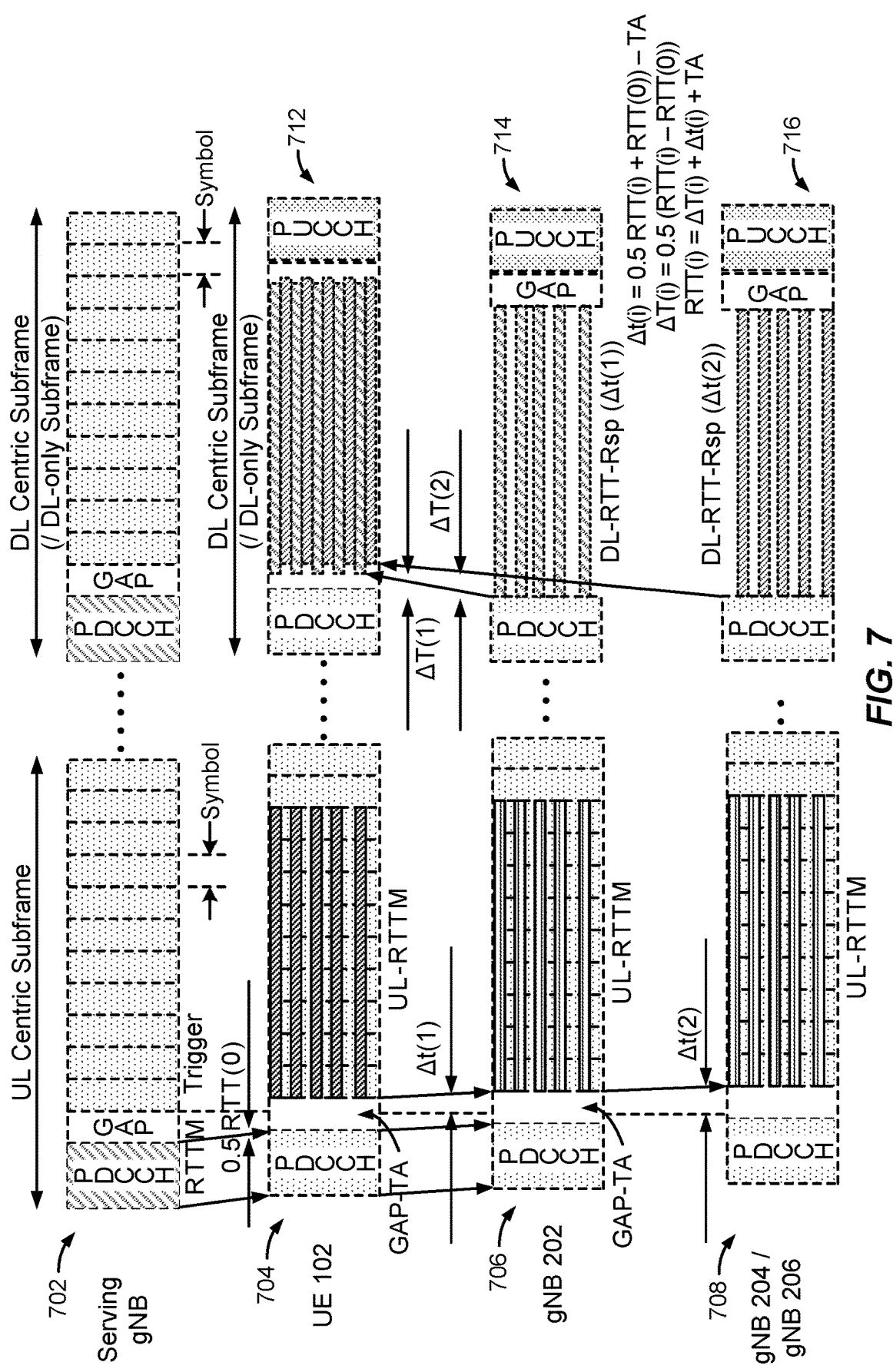
FIG. 7 illustrates an example of the UE-centric RTT estimation in accordance with various aspects of the disclosure.

FIG. 7 illustrates an example of the UE-centric RTT estimation technique according to an aspect of the disclosure. On an uplink-centric (at low duty-cycle) subframe 702, the serving gNodeB sends a control signal (e.g., on the PDCCH) to the UE 102, instructing the UE 102 (and any number of other UEs) to transmit one or more uplink RTTM signals.

During the uplink subframe 704, the UE 102 transmits one or more RTTM signals at specified (by the serving gNodeB) resource blocks (RBs) of the uplink data portion of the uplink subframe 704, in a TDM or FDM fashion (as illustrated by the horizontal subdivisions of the respective symbols of the uplink subframe 704). The RTTM signals may be wideband signals to enable more precise timing measurements. No other signals are transmitted on the symbols associated with the RTTM signals by any UE in the neighborhood (resulting in low reuse, interference avoidance, and deep penetration of the RTTM signal).

During the uplink subframes 706 and 708, each gNodeB in the neighborhood (i.e., within communication range of the UE 102; gNodeBs 202-206 in the example of FIG. 7) measures the RTTM arrival time (e.g., t2) and calculates the actual RTTM arrival time (e.g., t2') of each received RTTM. The serving gNodeB instructs the UE 102 to scan for/receive RTTR signals from the gNodeBs 202-206 on a subsequent downlink subframe, which occurs in the example of FIG. 7 during the downlink subframes 714 and 716. The RTTR signal from each gNodeB 202-206 includes the actual gNodeB turn-around time (t3'−t2') and/or the measured gNodeB turn-around time (t3−t2). In an aspect, the RTTR waveforms may be wideband signals to enable the UE 102 to make precise timing measurements.

The UE 102, and each UE in the neighborhood (e.g., all UEs within communication range of the serving gNodeB and gNodeBs 202-206), decodes the RTTR signals from the gNodeBs 202-206 during the downlink subframe 712, and also measures the RTTR arrival time t4 of the RTTR signal from the respective gNodeB(i) of the gNodeBs 202-206 and calculates the actual RTTR waveform arrival time t4' of the respective RTTR signals.

The RTT may be computed from the actual RTTR arrival time t4' at the UE 102, combined with timing information in the RTTR (e.g., the measured gNodeB turn-around time (t3−t2) and/or the actual gNodeB turn-around time (t3'−t2')). The RTT estimation procedures disclosed herein can be extended to massive Multiple Input-Multiple Output (MIMO) and to the extremely-high frequency (EHF) region of the spectrum, also known as millimeter wave (mmW) (generally, spectrum bands above 24 GHz) systems. In mmW band systems, as well as massive MIMO systems in any band, gNodeBs use transmission/reception beamforming to extend signal coverage to the cell edge.

For the network-centric RTT, when the RTTR payload is carried in the PUSCH, it may be carried using an uplink MAC-CE or as part of RRC signaling. For the UE-centric RTT, the RTTR payload may be carried in the PDSCH as part of RRC signaling, or in the MAC-CE, or in the DCI.

Transmit "beamforming" is a technique for focusing an RF signal in a specific direction. Traditionally, when a base station broadcasts an RF signal, it broadcasts the signal in all directions (omni-directionally). With transmit beamforming, the base station determines where a given target device (e.g., UE 102) is located (relative to the base station) and projects a stronger downlink RF signal in that specific direction, thereby providing a faster (in terms of data rate) and stronger RF signal for the receiving device(s). To change the directionality of the RF signal when transmitting, a base station can control the phase and relative amplitude of the RF signal at each transmitter. For example, a base station may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions. It is of course contemplated that the UE can also be a transmitter with beam forming capabilities.

In receive beamforming, the receiver (e.g., gNodeB, UE) uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., Reference Signal Received Power (RSRP), Signal-to-Noise plus Interference Ratio (SINR), etc.) of the RF signals received from that direction.

The term "cell" refers to a logical communication entity used for communication with a base station (e.g., over a carrier), and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others)

that may provide access for different types of devices. In some cases, the term "cell" may refer to a portion of a geographic coverage area (e.g., a sector) over which the logical entity operates.

Figure 8:
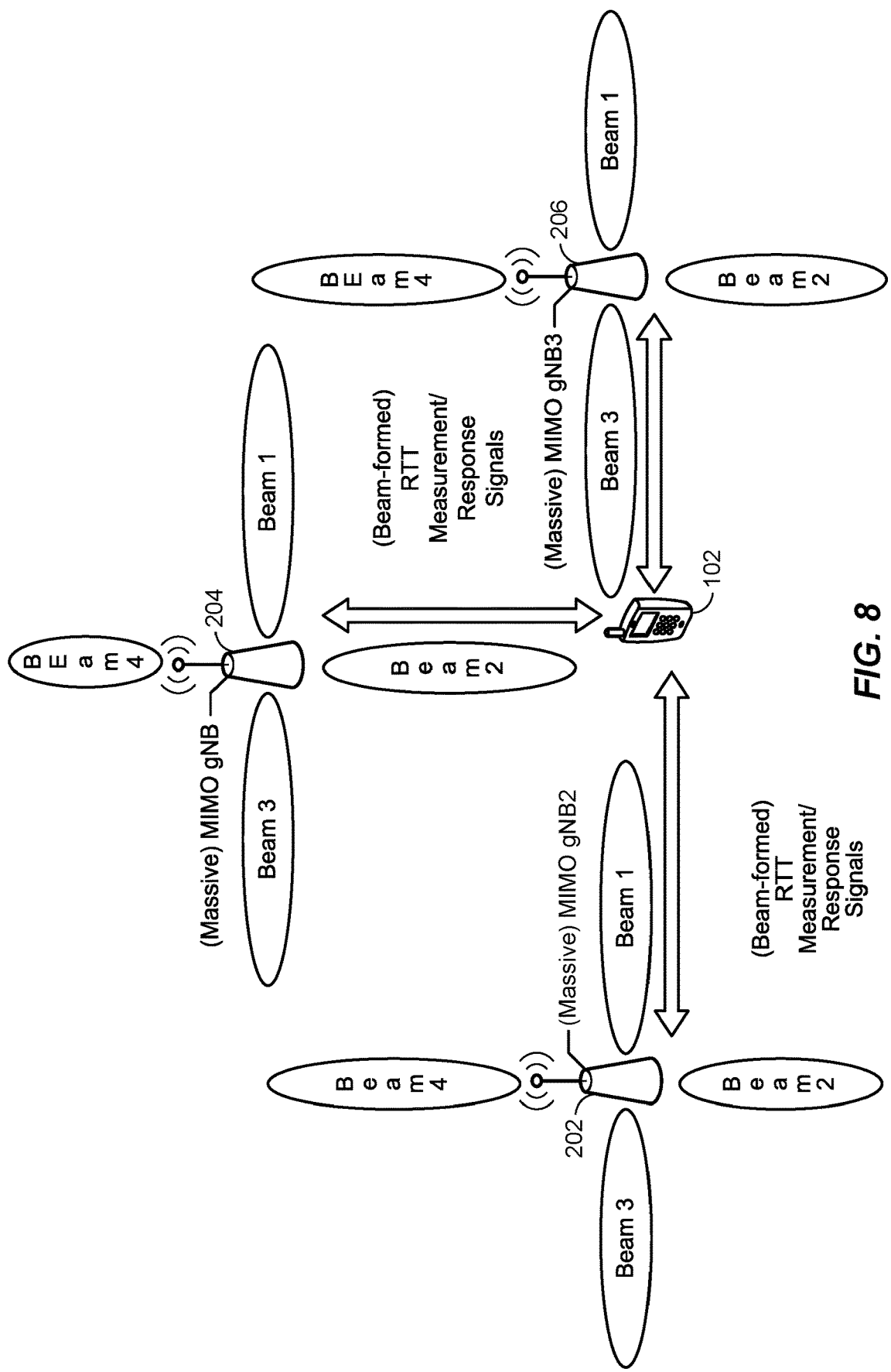
FIG. 8 illustrates an exemplary system in which the RTT estimation procedures are extended to massive Multiple Input-Multiple Output (MIMO) and/or millimeter wave (mmW) systems in accordance with various aspects of the disclosure.

FIG. 8 illustrates an exemplary system in which the RTT estimation procedures disclosed herein are extended to massive MIMO and mmW systems according to an aspect of the disclosure. In the example of FIG. 8, gNodeBs 202-206 are massive MIMO gNodeBs. To perform the RTT estimation procedure described herein in massively beam-formed systems (e.g., MIMO, mmW), each physical gNodeB (e.g., gNodeBs 202-206) acts like a set of multiple "logical gNodeBs," transmitting RTTM or RTTR signals on multiple beams (e.g., beams 1-4) on different time-frequency resources, in a TDM or FDM fashion. The RTTM/RTTR signals may (implicitly or explicitly) carry information about the identity of the gNodeB transmitting the signal, as well as the beam-index (e.g., 1-4) used to transmit them. The UE (e.g., UE 102) processes the RTTM/RTTR signals received on the downlink as if they were transmitted by different gNodeBs. In particular, it records or reports the beam index (or indices) on which the RTT signals were received, in addition to the timestamps (e.g., turn-around times) described earlier.

During reception, the gNodeBs 202-206 record/report the beam index on which the RTT signals were received from the UE 102, and include that information in the RTTR payload, along with the timestamps (e.g., turn-around time) described earlier. In case the gNodeBs 202-206 have fewer RF chains than the number of receive beams it uses (as a single hardware receiver chain may be configurable to generate multiple receive beams), the UE 102 may be commanded to repeat the RTTM/RTTR signals multiple times, so that the gNodeB may sequentially cycle through the set of all receive beams that may be used to receive the RTT signals from the UE 102, based on its limited base-band processing capabilities. Note that different beam directions would result in different directional gains for the different multipath delays. Since RTT and OTDOA positioning methods rely on estimating the direct delay corresponding to the line-of-sight (LOS) path between the transmitter and receiver, it is of interest to identify the earliest arriving path, and this identification may be improved by using different transmit and receive beams.

An RF chain may be a receiver chain or a transmitter chain, and is the hardware utilized to receive or transmit RF signals of a given frequency or set of frequencies. More specifically, a receiver chain includes the hardware components of a single hardware receiver of a plurality of hardware receivers of the device, and may include a receive antenna, radio, and modem. Likewise, a transmitter chain includes the hardware components of a single hardware transmitter of a plurality of hardware transmitters of the device, and may include a transmit antenna, radio, and modem. A device (e.g., a gNodeB 202-206 or UE 102) may have multiple receiver/transmitter chains, and may thereby be able to transmit and/or receive RF signals on multiple frequencies at the same time.

In an aspect, in (massive) MIMO systems, either or both of the gNodeBs 202-206 and the UE 102 may repeat their RTTMs/RTTRs multiple times. The different repetitions may use either the same or different transmission beams. When a signal is repeated with the same transmission beam, it is intended to support reception-beam-sweeping (in addition to coherent-combining if needed) at the receiving end-point (the UE 102 or a gNodeB 202-206).

In an aspect, the angle-of-arrival (AoA)/angle-of-departure (AoD) (at the gNodeB 202-206) associated with the beam-index information may be used in conjunction with RTT estimates to compute the geographic position of the UE (RTT plus AoA/AoD based positioning).

As mentioned above, in RTT-based positioning, the transmitter (e.g., gNodeB/UE) acts at measured RTTM transmit time t1 to send an RTTM signal, but the RTTM signal leaves the transmitter at actual RTTM transmit time t1'. The RTTM signal arrives at the receiver (e.g., UE/gNodeB) at actual RTTM arrival time t2', but is detected by the receiver at measured RTTM arrival time t2. The receiver acts to respond to transmit the RTTR signal at the RTTR transmit time t3, but the RTTR waveform leaves the receiver at actual RTTR transmit time t3'. The RTTR waveform arrives at the transmitter at actual RTTR arrival time t4', but is detected by the transmitter at measured RTTR arrival time t4. To determine the RTT accurately, equation (10), (10a), (13) or (13a) may be used.

As indicated, the RTTR signal serves at least two purposes. First, the RTTR waveform is measured or otherwise detected by the transmitter at the measured RTTR arrival time t4, from which the actual RTTR arrival time t4' can be determined. Second, the RTTR payload informs the transmitter of the actual/measured turn-around time (t3'−t2')/(t3'−t2') at the receiver. In this way, the transmitter is able to calculate the actual RTT as (t4'−t1')−(t3'−t2'), from which the distance between the transmitter and the receiver may be determined through RTT-based positioning (e.g., as an intersection of circles in 2D or spheres) or through OTDOA-based positioning (e.g., as an intersection of hyperbolas or hyperboloids).

Various physical (PHY) layer signals may be used for RTTM and RTTR signals. In an aspect, positioning reference signals (PRS), which is used for OTDOA, may be reused for the RTTM signal. For example, a particular channel state information reference signal (CSIRS) may be configured for RTTM signal. Similarly, a synchronization signal block (SSB) on DL, and sounding reference signal (SRS) on UL may be configured as RTTM signal. In an aspect, these signals may be configured for use in creating OTDOA reports (e.g., RS timing difference (RSTD)), RTT-based reports (e.g., RTTR payload), or both.

The SRS configured for uplink time difference of arrival (UTDOA) and/or RTTR waveforms may be related with a reference RF signal configured for downlink as PRS, RTTM signal, or both. In this regard, the term "related" may refer to quasi-co-location (QCL) or spatialRelationInfo relation, or to a reference RF signal for deriving DL pathloss reference for UL power control. The relation may depend on the periodicity of the SRS-aperiodic, semi-persistent, or periodic. For example, an aperiodic SRS (A-SRS) serving as UL PRS may be QCLed with an aperiodic CSIRS (A-CSIRS) serving as DL PRS. As another example, an A-SRS serving as an RTTR waveform may be QCLed with an A-CSIRS serving as RTTM signal.

Regarding QCL relationship, the following is provided. When signals such as transmit beams are said to be QCL, this indicates that the beams appear to the receiver as having the same parameters, regardless of whether or not the transmitting antennas themselves are physically collocated. In 5G NR, there are four types of QCL relations. Specifically, a QCL relation of a given type means that certain parameters related to the propagation channel experienced by a second signal on a second beam can be derived from information about a first source signal on a source beam. Thus, if the QCL relation type is QCL Type A, the receiver can use the source signal to estimate the Doppler shift, Doppler spread, average delay, and delay spread of a second signal. If the QCL relation type is QCL Type B, the receiver can use the source signal to estimate the Doppler shift and Doppler spread of a second signal. If the QCL relation type is QCL Type C, the receiver can use the source signal to estimate the Doppler shift and average delay of a second signal. If the QCL relation type is QCL Type D, the receiver can use the source signal to estimate the spatial receive parameter (i.e., receive beam) of a second signal. Note that additional QCL types may be defined for future applications, and specifically for positioning-related applications, for example, QCL type E relating to average delay and delay spread. The description herein in general applies to any such QCL relation.

In an aspect, signals used as PRS/RTTM (for network-centric RTT)/RTTR (for UE-centric RTT) may be implicitly QCLed with SSB when frequency division multiplexed with SSB. In this way, the receiver (e.g., the UE) may use the same Rx beam. It is noted that implicit QCL may be a function of the UE's capability. For example, implicit QCL may be used when the UE indicates that it is only capable of a single beam operation.

Figure 9:
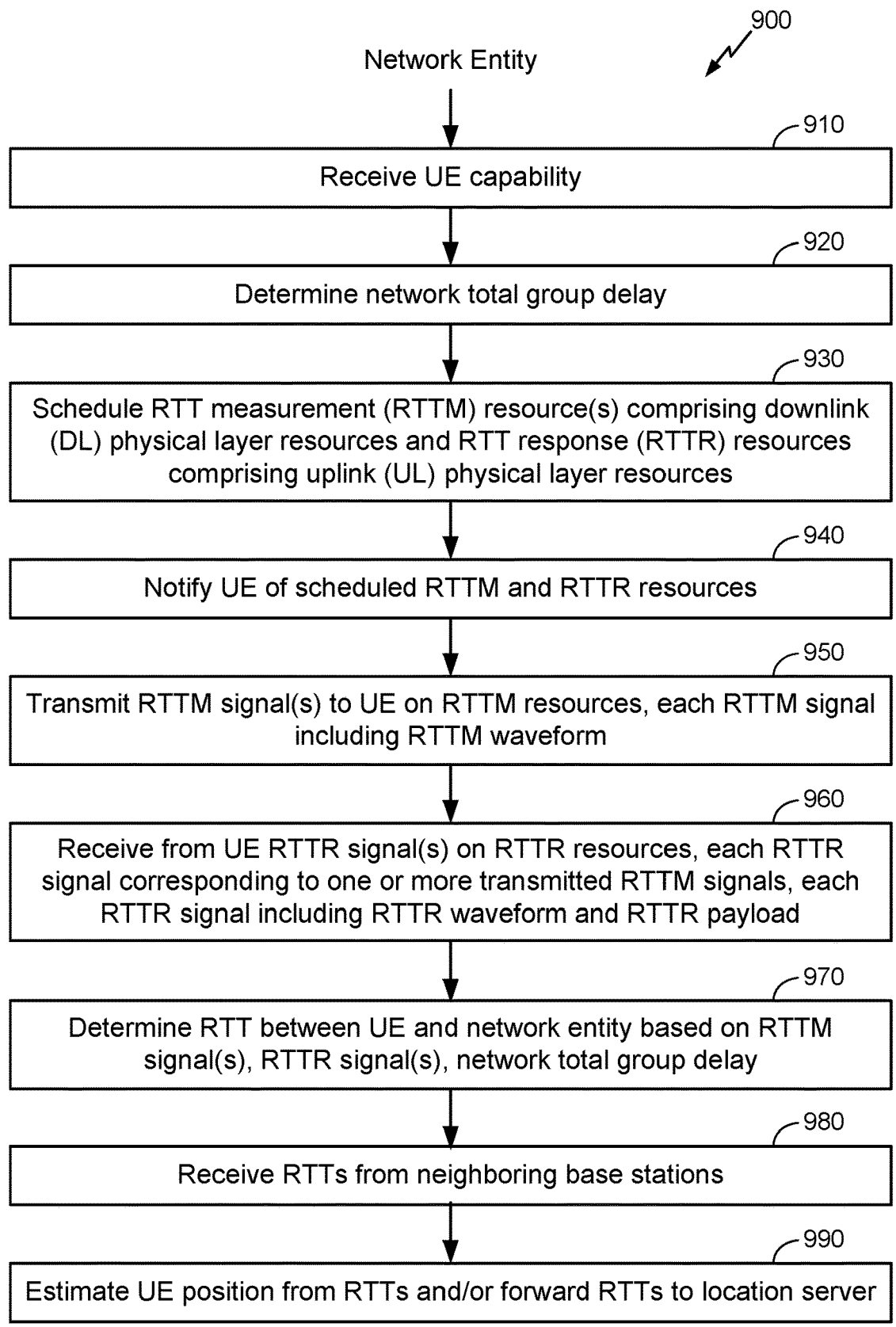
FIGS. 9 and 10 illustrate an exemplary method performed by a network entity in accordance with various aspects of the disclosure.

FIG. 9 illustrates an exemplary method 900 for determining an RTT of a UE (e.g., UE 102) performed by a network entity which may be a network node or a core network entity. The network node may be a serving base station (e.g., any of gNodeBs 202-206) or a serving cell (e.g., a cell of any of gNodeBs 202-206). The core network entity may be a server (e.g., location server, location management function (LMF)), etc.) The method 900 may be performed by the apparatus 304 and/or the apparatus 306 of FIG. 3. At 910, the network entity may receive a report from the UE of its capability(ies). For example, the UE may report its measurement capabilities (e.g., types of measurements, accuracy of measurements (e.g., accuracy of group delay measurements), MIMO capacity, FDD capability, and so on.

At 920, the network entity may determine a network total GD, which comprises a network transmission GD and a network reception GD. The network transmission GD indicates a time interval between a measured transmission time of a network Tx signal (e.g., RTTM signal) transmitted from a network node and an actual transmission time of the network Tx signal leaving the network node. The network reception GD indicates a time interval between an actual arrival time of a network Rx signal (e.g., RTTR signal) at the network node and a measured arrival time of the network Tx signal at the network node.

Figure 10:
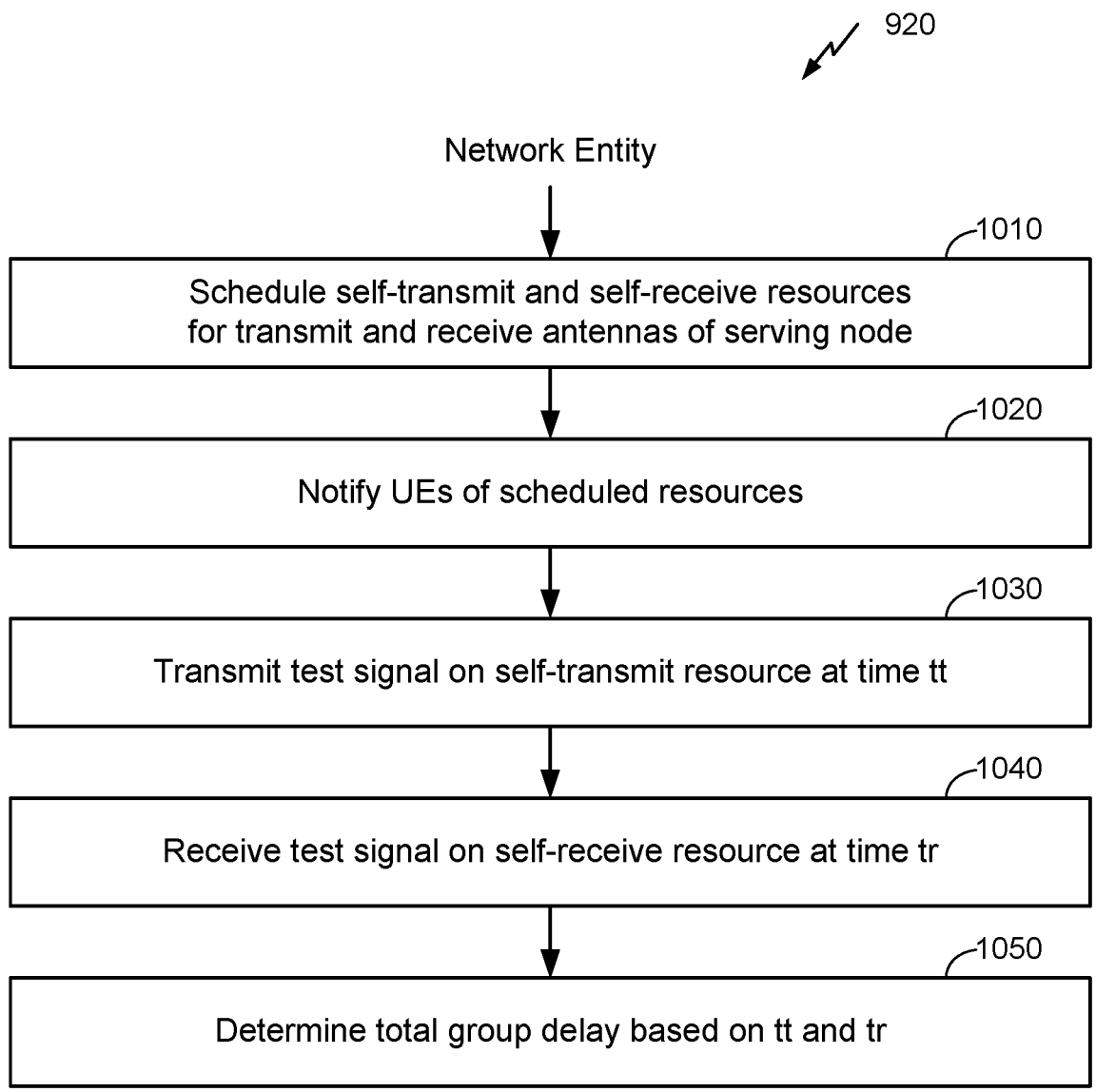

FIG. 10 illustrates an example process performed by the network entity to implement block 920, i.e., determine the network total GD. At 1010, the network entity (e.g., a serving node) may schedule self-transmit and self-receive resources for transmit and receive antennas. The self-transmit resources may comprise physical layer resources, and the self-receive resources may also comprise physical layer resources. If necessary, at 1020, the network entity notifies the UEs of the scheduled resources (e.g., in downlink control information (DCI)) so that the UEs will not interfere.

At 1030, the network entity may transmit a test signal from the transmit antenna at transmit time tt. The transmit time tt is in the digital domain and may correspond to a frame, subframe, or a slot of the self-transmit resource in which symbols of the test signal are scheduled for transmission. The test signal may be a simulated RTTR signal. At 1040, the network entity may listen on the receive antenna and detect the reception of the test signal at receive time tr. The receive time tr is in the digital domain and may correspond to a frame, subframe, or a slot of the self-receive resource in which received symbols contained therein are recognized as the symbols of the test signal.

At 1050, the network entity may determine the network total GD based on the transmit and receive times tt, tr. As indicated above with respect to FIG. 5, the transmit time tt represents a time just prior to the conversion of the digital symbols of the test signal to an RF signal for transmission and the receive time tr represents a time just subsequent to the conversion of the received RF signal back to the digital symbols. Thus, the network total GD, defined as a sum of the network transmission GD and the network reception GD, becomes (tr−tt−ts) where ts accounts for the separation between the transmit and receive antennas. If the separation is negligible, then the network total GD=(tr−tt).

The network entity may perform the process of FIG. 10 multiple times. The network entity may determine the total network GD for different combinations of transmit and receive antennas. If the network entity is part of an FDD system, then frequencies may be taken into account. For example, for a given transmit and receive antenna combination, the process may be performed for each operating frequency f. Other factors such as the modulation and coding scheme (MCS) may also be considered.

Referring back to FIG. 9, at 930, the network entity may schedule RTTM resources for transmitting one or more RTTM signals to the UE, and also schedule RTTR resources for receiving one or more RTTR signals from the UE. The RTTM resources may comprise downlink (DL) physical layer resources. For example, CSIRS, PRS, TRS, and/or SSB) may be configured for use as the RTTM waveform. The RTTR resources may comprise uplink (UL) physical layer resources. For example, uplink SRS may be configured for use as the RTTR waveform. As another example, PUCCH and/or PUSCH resources may be allocated to carry the RTTR payload. The PUCCH/PUSCH may be sized based on the payload (e.g., may be sized based on the amount of UE turn-around times and/or UE Rx-Tx time differences to be reported, amount of DL timing information to be reported, etc.).

For convenience and brevity, term "response delay" will be used to refer to turn-around time and/or Rx-Tx time differences. Thus, "measured response delay" may refer to measured turn-around time (t3−t2) and/or measured Rx-Tx time difference (t2−t3) for both the UE and the network entity. Similarly, "actual response delay" may refer to actual turn-around time (t3'−t2') and/or actual Rx-Tx time difference (t2'−t3') UE and the network entity. Then at 930, it may be said that the PUCCH/PUSCH may be sized based on the amount of UE response delays to be reported, amount of DL timing information to be reported, etc.).

At 940, the network entity may notify the UE, e.g., by sending a control signal, of the scheduled RTTM resources so that the UE can properly listen for the RTTM waveforms. The control signal may also notify the UE of the scheduled RTTR resources so that the UE can transmit the RTTR waveforms and the RTTR payload on the proper resources.

At 950, the network entity may transmit the one or more RTTM signals to the UE on the RTTM resources. Each RTTM signal may comprise an RTTM waveform, which enables the UE to detect/measure the RTTM signal. For each RTTM signal, the network entity may measure the transmission of the RTTM waveform at the measured RTTM transmit time t1 in the digital domain. For example, the measured RTTM transmit time t1 may correspond to the frame, subframe, or a slot of the RTTM resource scheduled/allocated for the symbols of the RTTM signal. The measured RTTM transmit time t1 may represent a time just prior to the symbols of the RTTM signal being converted to RTTM waveform for transmission. Each RTTM transmit time may be independent of RTTM transmit times of other RTTM signals.

In an aspect, the network entity may adjust the bandwidth of the transmitted RTTM waveforms based on the UE capabilities. In general, wider bandwidth enables the UE to more accurately measure the arrival times of the RTTM waveforms. However, such accuracy would be wasted if the UE's group delay measurement uncertainty overwhelms the high accuracy timing estimate. By provisioning the bandwidth accordingly, such waste can be prevented.

At 960, the network entity may receive one or more RTTR signals from the UE on the RTTR resources. Each RTTR signal may correspond to one or more of the transmitted RTTM signals and may comprise an RTTR waveform and an RTTR payload. The RTTR waveform enables the network entity to detect/measure the RTTR signal. For each RTTR signal, the network may measure the reception of the RTTR waveform at the measured RTTR arrival time t4 in the digital domain. For example, the measured RTTR arrival time t4 may correspond to the frame, subframe, or a slot of the scheduled/allocated RTTR resource in which the symbols contained therein are the symbols of the RTTR signal. The measured RTTR arrival time t4 may represent a time just subsequent to the RTTR waveform being converted to symbols of the RTTR signal. Each RTTR payload may comprise a UE response delay (actual or measured) indicating a duration between the UE receiving the RTTM waveform and transmitting the RTTR waveform. In other words, each RTTR payload may comprise UE turn-around time (actual or measured) and/or UE Rx-Tx time difference (actual or measured).

At 970, the network entity may determine the RTT between the UE and the network entity based on the RTTM signal(s), the RTTR signal(s), and the network total group delay. Note that the network entity has available the measured RTTM transmit time t1 (determined at 950) and the measured RTTR arrival time t4 (determined at 960). The network entity also has available the network total GD (determined at 910).

In one aspect, the RTTR payload may explicitly include the actual UE response delay (e.g., actual turn-around time (t3'-t2') and/or actual UE Rx-Tx time difference (t2'-t3')). In this one aspect, the network entity may utilize equation (13) and/or equation (13a) to calculate the RTT. For example, if the RTTR payload includes the actual turn-around time (t3'-t2'), the UE may calculate the RTT through equation (13) by subtracting a sum of the actual UE turn-around time and the network total GD from the measured total time. If the RTTR payload includes the actual Rx-Tx time difference (t2'-t3'), the UE may calculate the RTT through equation (13a) by subtracting the network total GD from a sum of the measured total time and the actual UE Rx-Tx time difference.

In another aspect, the RTTR payload may explicitly include the measured UE response delay (e.g., measured turn-around time (t3-t2) and/or measured UE Rx-Tx time difference (t2-t3)). Also the UE may alter the transmission timing of the RTTR signal such that the RTTR waveform arrival time at the network entity deviates from the expected arrival time by a deviation amount corresponding to the UE total GD. In this another aspect, the network entity may utilize equation (10) and/or (10a) to calculate the RTT. For example, if the RTTR payload includes the measured turn-around time, then the UE may calculate the RTT through equation (10) by subtracting a sum of the measured UE turn-around time, the network total GD, and the deviation amount from the measured total time. If the RTTR payload includes the measured Rx-Tx time difference (t2-t3), the UE may calculate the RTT through equation (10a) by subtracting a sum of the network total GD and the deviation amount from a sum of the measured total time and the measured Rx-Tx time difference.

Instead or in addition to altering the transmission timing of the RTTR signal, the RTTR payload may include the deviation amount. In other words, the RTTR payload can include both the measured UE response delay and the deviation amount. But it need not always include both (e.g., the UE's environment may be fairly static implying that there are not much changes to the measured UE response delay and the deviation amount between reports). By not reporting both, overhead may be saved. It may be expected that the UE total GD will be included less frequently than the measured UE response delay.

The measured UE response delay (e.g., the measured UE turn-around time used in equation (10) and/or the measured UE Rx-Tx time difference used in equation (10a) to determine the RTT) may be the measured UE response delay included in the RTTR payload. If not included, then the measured UE response delay included in a previous RTTR payload may be used. Similarly, the UE total GD used in equation (10) to determine the RTT may be the deviation amount included in the RTTR payload. If not included, then the deviation amount included in a previous RTTR payload may be used.

In an aspect, a plurality of RTTM signals may be transmitted at 950 and a plurality of RTTR signals may be received at 960. For example, the network entity may utilize a plurality of transmit beams to communicate with the UE (e.g., different transmit beams are used at different junctures when the UE is moving). The plurality of RTTM signals may be transmitted on the plurality of transmit beams of the network entity and received by the UE on its plurality of receive beams. Correspondingly, the UE may transmit a plurality of RTTR signals on its own plurality of transmit beams and received by the network entity on its plurality of receive beams.

When RTTs are determined between the UE and a plurality of base stations (e.g., gNodeBs 202-206), the position of the UE can be estimated. To accommodate, the notification provided at 940 may notify the UE of the plurality of base stations that will be transmitting corresponding plurality of RTTM signals to the UE. For example, the UE may be notified of a plurality RTTM resources scheduled for the plurality of base stations. Also, the RTTR resources scheduled at 930 should be sufficient to carry a plurality of UE response delays (actual or measured) corresponding to the plurality of RTTR waveforms transmitted from the plurality of base stations. Then at 960, the received RTTR payload includes the plurality of UE response delays. The plurality of base stations may be neighboring base stations within communication range of the UE.

To determine the position of the UE, at 980, the network entity may receive (e.g., through the X2 interface) a plurality of RTTs from the plurality of base stations, where each base station has calculated the RTT between that base station and the UE. At 990, the network entity may estimate the UE's position based on the plurality of RTTs as well as the RTT between the network entity and the UE. Alternatively or in addition thereto, the network entity may forward the RTTs to a location server to estimate the UE's position.

Figure 11:
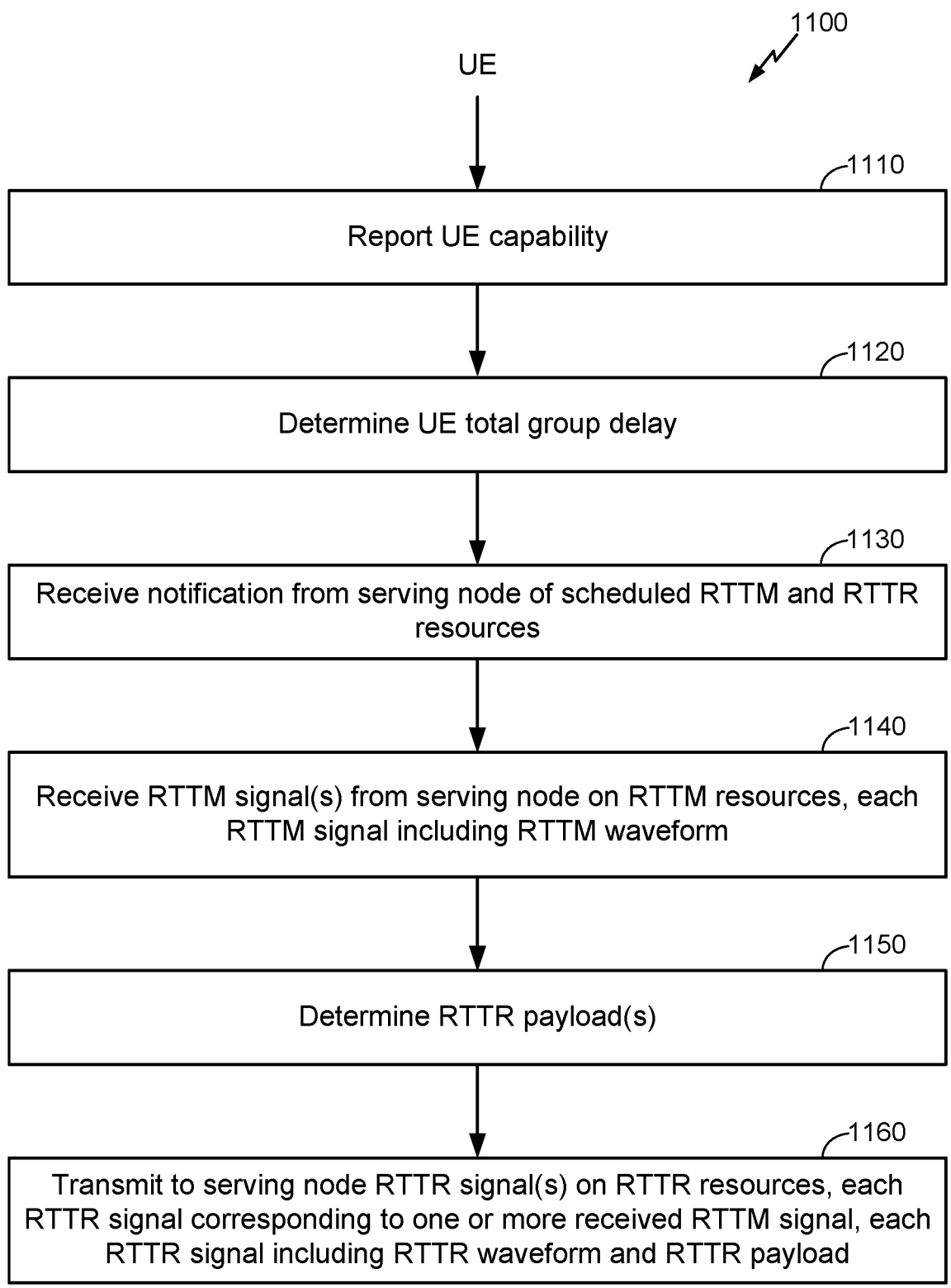
FIGS. 11 and 12 illustrate an exemplary method performed by a UE in accordance with various aspects of the disclosure.

FIG. 11 illustrates an exemplary method 1100 performed by the UE (such as the UE 102) in determining the RTT. At 1110, the UE may provide a UE capability report to the network entity. For example, the UE may report its measurement capabilities (e.g., types of measurements, accuracy of measurements (e.g., accuracy of group delay measurements), MIMO capacity, FDD capability, and so on. At 1120, the UE may determine a UE total GD, which comprises a UE transmission GD and a UE reception GD. The UE transmission GD indicates a time interval between a measured transmission time of a UE Tx signal (e.g., RTTR signal) transmitted from the UE and an actual transmission time of the UE Tx signal leaving the UE. The UE reception GD indicates a time interval between an actual arrival time of a UE Rx signal (e.g., RTTM signal) at the UE and a measured arrival time of the UE Rx signal at the UE.

Figure 12:
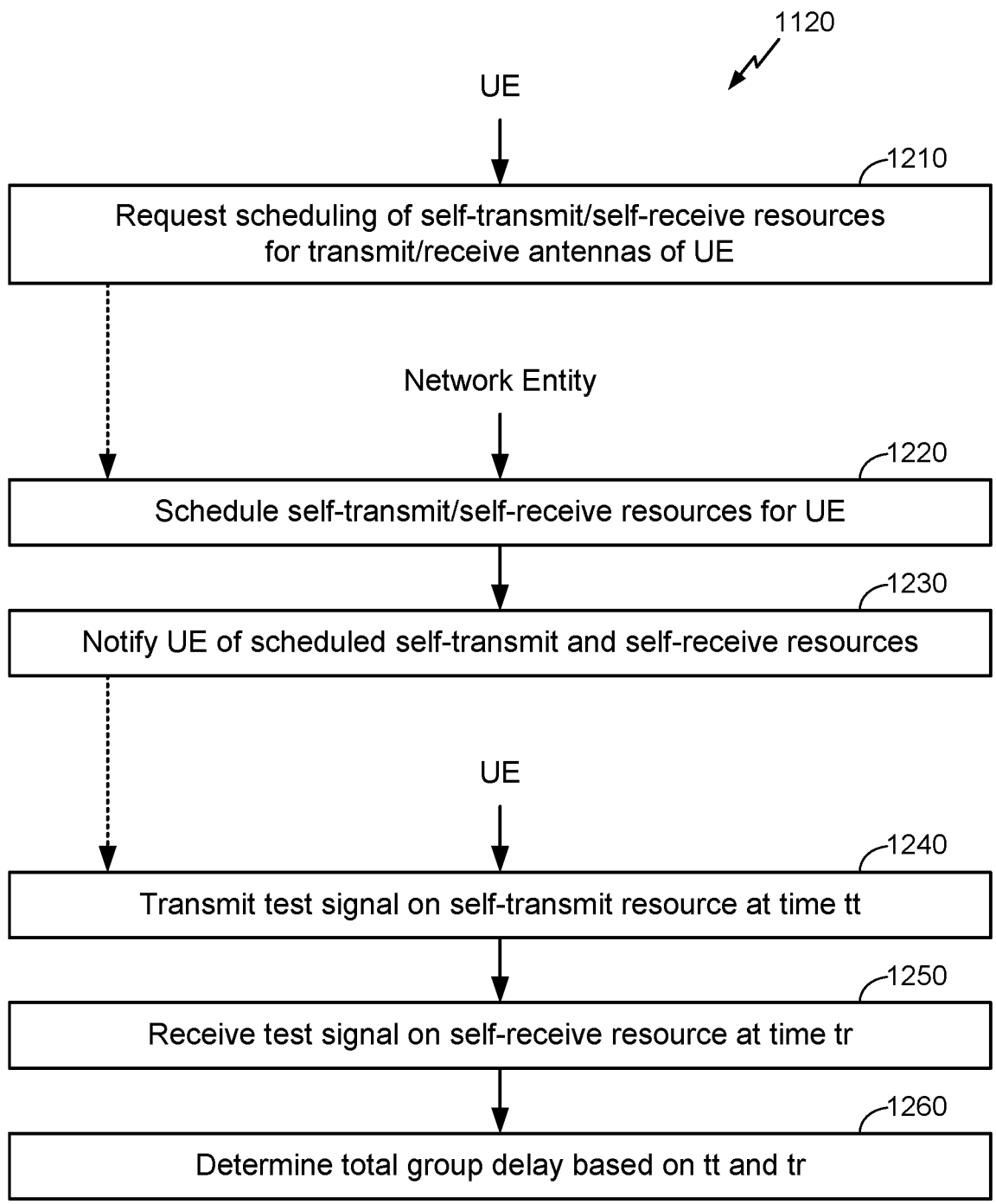

FIG. 12 illustrates an example process performed to implement block 1120, i.e., determine the UE total GD. At 1210, the UE may request to the network entity scheduling of self-transmit and self-receive resources to be allocated for Tx and Rx antennas of the UE. The network entity may schedule the resources at 1220 and may notify the UE at 1230. The network entity may take into account the UE capabilities received at 1110 when scheduling the resources. The self-transmit resources may comprise physical layer resources, and the self-receive resources may also comprise physical layer resources. The resources may be scheduled such that there will be minimal interferences to the UE.

At 1240, the UE may transmit a test signal from the transmit antenna at transmit time tt. The transmit time tt is in the digital domain and may correspond to a frame, subframe, or a slot of the self-transmit resource in which symbols of the test signal are scheduled for transmission. The test signal may be a simulated RTTM signal. At 1250, the UE may listen on the received antenna and detect the reception of the test signal at receive time tr. The receive time tr is in the digital domain and may correspond to a frame, subframe, or a slot of the self-receive resource in which received symbols contained therein are recognized as the symbols of the test signal.

Since free antennas are needed for Rx during Tx transmission, the UE may request scheduling of resources for calibration gap with rank reduction at 1210. Alternatively or in addition thereto, the network entity may schedule the resources for calibration gap with rank reduction at 1220. Rank reduction indicates that the maximum rank of transmissions during the gap is reduced, which ensures that UE does not have to use all its transmit antennas during the calibration gap, thus allowing some antennas to be freed up for Rx.

This can also involve reducing, limiting or altering other parameters associated with scheduled transmissions during the gap. For example, the MCS may be limited. In another example, the UE may choose a transmit beamformer that requires fewer number of antenna elements or panels, freeing up other antenna elements or panels for reception. The reduction in beamforming gain can be compensated for by increasing transmit power, either by an explicit override of the power control formula during the gap, or by existing power control mechanism in which the downlink pathloss measured increases because the same set of fewer antenna elements is also used to form the beam used as downlink pathloss reference for the power control loop.

At 1260, the UE may determine the UE total GD based on the transmit and receive times tt, tr. As indicated above with respect to FIGS. 5 and 10, the transmit time tr may represent a time just prior to the conversion of the digital symbols of the test signal to an RF signal for transmission and the receive time tr may represent a time just subsequent to the conversion of the received RF signal back to the digital symbols. Thus, the UE total GD, defined as a sum of the UE transmission GD and the UE reception GD, becomes (tr−tt−ts) where ts accounts for the separation between the transmit and receive antennas. If the separation is negligible, then the UE total GD can be reduced to (tr−tt).

The UE may perform the process of FIG. 12 multiple times. The UE may determine the total GD for different combinations of transmit and receive antennas. If the UE is FDD capable, then frequencies may be taken into account. For an FDD capable UE, it is usually the case that the UE Rx does not have to listen at its Tx frequency. Even if the UE includes a special RX for that frequency, it may not have the same group delay as the usual Rx chain. In this instance, as part of its capability reporting, the UE may report whether it has such a special Rx, and a corresponding accuracy of group-delay measurement based on the difference in center frequency. In an aspect, the special Rx may be a regular Rx with a different down-conversion frequency fc in the RF front-end, and the impact of fc on group delay may be calibrated, e.g., in off-line testing as part of factory calibration. Even for FDD group delay determination, it may be prudent to include resources for calibration gap with rank reduction, for example, to free up some transmit antennas which may then be used for reception instead, as described earlier. Other factors such as the modulation and coding scheme (MCS) may also be considered.

Referring back to FIG. 11, at 1130, the UE may receive notification from the network entity, e.g., through a control signal, of the scheduled RTTM and RTTR resources. At 1140, the UE may receive the one or more RTTM signals on the RTTM resources from the network. For each RTTM signal, the UE may measure the arrival of the RTTM waveform at the measured RTTM arrival time t2 in the digital domain. For example, the measured RTTM arrival time t2 may correspond to the frame, subframe, or a slot of the scheduled/allocated RTTM resource in which the symbols contained therein are the symbols of the RTTM signal. The measured RTTM arrival time t2 may represent a time just subsequent to the RTTM waveform being converted to symbols of the RTTM signal. Each RTTM arrival time may be independent of other RTTM arrival times.

At 1150, the UE may determine the payloads for the corresponding RTTR resources. In one aspect, the UE may explicitly include the actual UE response delay (e.g., actual UE turn-around time (t3′−t2′) and/or the actual UE Rx-Tx time difference (t2′−t3′)) in the RTTR payload. Note that the UE has available the UE total GD (determined at 1120). The UE also has available the measured RTTM arrival time t2. Further, UE is aware of the scheduled transmission time of the RTTR waveform in the digital domain. That is, the UE has available the measured RTTR transmit time t3, which may correspond to the frame, subframe, or a slot of the RTTR resource scheduled/allocated for the symbols of the RTTR signal. Therefore, in this one aspect, the UE may calculate the actual UE response delay. That is, the UE may calculate the actual UE turn-around time through equation (11). For example, the UE may calculate the actual UE turn-around time by adding the UE total GD to the measured UE turn-around time. Alternatively or in addition thereto, the UE may calculate the actual UE turn-around time through equation (11a). For example, the UE may calculate the actual UE Rx-Tx time difference by subtracting the UE total GD from the measured UE Rx-Tx time difference. In another aspect, the UE may explicitly include the measured UE response delay in the RTTR payload. In both aspects, the measured RTTR transmit time t3 may represent a time just prior to the symbols of the RTTR signal being converted to RTTR waveform for transmission.

At 1160, the UE may transmit the RTTR signal(s). If the actual UE response delay is included in the RTTR payload, then the UE may transmit the RTTR signal by applying the timing advance (TA) commanded by the network entity. On the other hand, if the RTTR payload includes the measured UE response delay, then the UE may alter the transmission timing of the RTTR signal by an amount corresponding to the UE total GD. For example, the UE may advance the transmission timing by the UE total GD amount over and above the TA commanded by the network entity. Alternatively or in addition thereto, the UE may include the UE total GD when advancing the transmission time. In other words, the RTTR payload can include both the measured UE response delay and the deviation amount, but need not include all.

It should be noted that not all illustrated blocks of FIGS. 9-12 need be performed, i.e., some blocks may be optional. Also, the numerical references to the blocks in these figures should not be taken as requiring that the blocks should be performed in a certain order. Indeed, some blocks may be performed concurrently.

Figure 13:
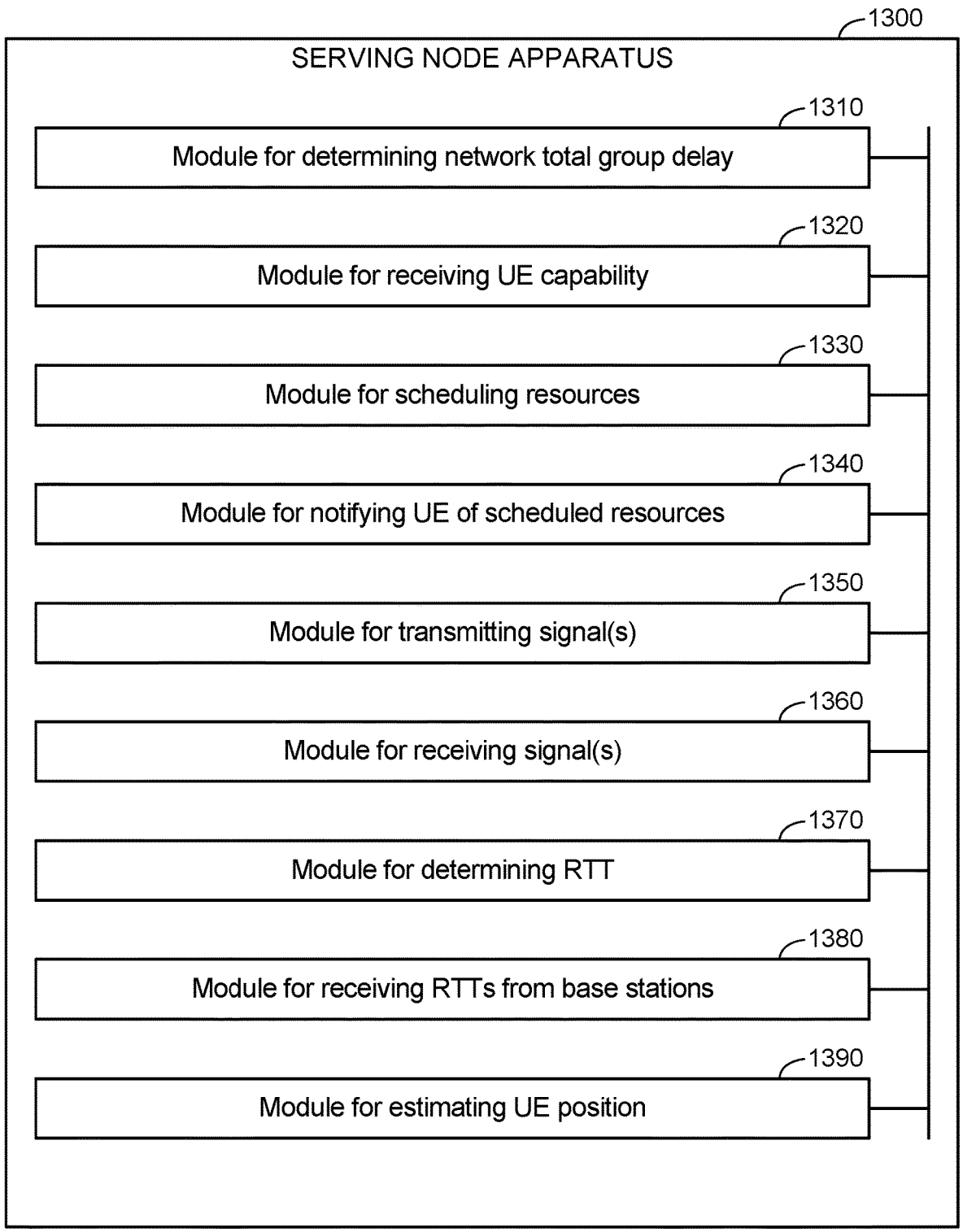
FIGS. 13 and 14 are other simplified block diagrams of several sample aspects of apparatuses configured to support positioning and communication in accordance with various aspects of the disclosure.

FIG. 13 illustrates an example network entity apparatus 1300 (e.g., any of gNodeBs 202-206, location server, LMF, etc.) represented as a series of interrelated functional modules connected by a common bus. A module for determining network total group 1310 may correspond at least in some aspects to, for example, a processing system, such as processing system 334 in FIG. 3, as discussed herein. A module for receiving UE capability 1320 may correspond at least in some aspects to, for example, a communication device, such as communication device 314 in FIG. 3, and/or a processing system, such as processing system 334 in FIG. 3, as discussed herein. A module for scheduling resources 1330 may correspond at least in some aspects to, for example, a processing system, such as processing system 334 in FIG. 3, as discussed herein. A module for notifying UE of scheduled resources 1340 may correspond at least in some aspects to, for example, a communication device, such as communication device 314 in FIG. 3, and/or a processing system, such as processing system 334 in FIG. 3, as discussed herein. A module for transmitting signal(s) 1350 (e.g., RTTM signals, test signals, etc.) may correspond at least in some aspects to, for example, a communication device, such as communication device 314 in FIG. 3, and/or a processing system, such as processing system 334 in FIG. 3, as discussed herein. A module for receiving signal(s) 1360 (e.g., RTTR signals, test signals, etc.) may correspond at least in some aspects to, for example, a processing system, such as processing system 334 in FIG. 3, as discussed herein. A module for determining RTT 1370 may correspond at least in some aspects to, for example, a processing system, such as processing system 334 in FIG. 3, as discussed herein. A module for receiving RTTs 1380 may correspond at least in some aspects to, for example, a processing system, such as processing system 334 in FIG. 3, as discussed herein. A module for estimating 1390 may correspond at least in some aspects to, for example, a processing system, such as processing system 334 in FIG. 3, as discussed herein.

Figure 14:
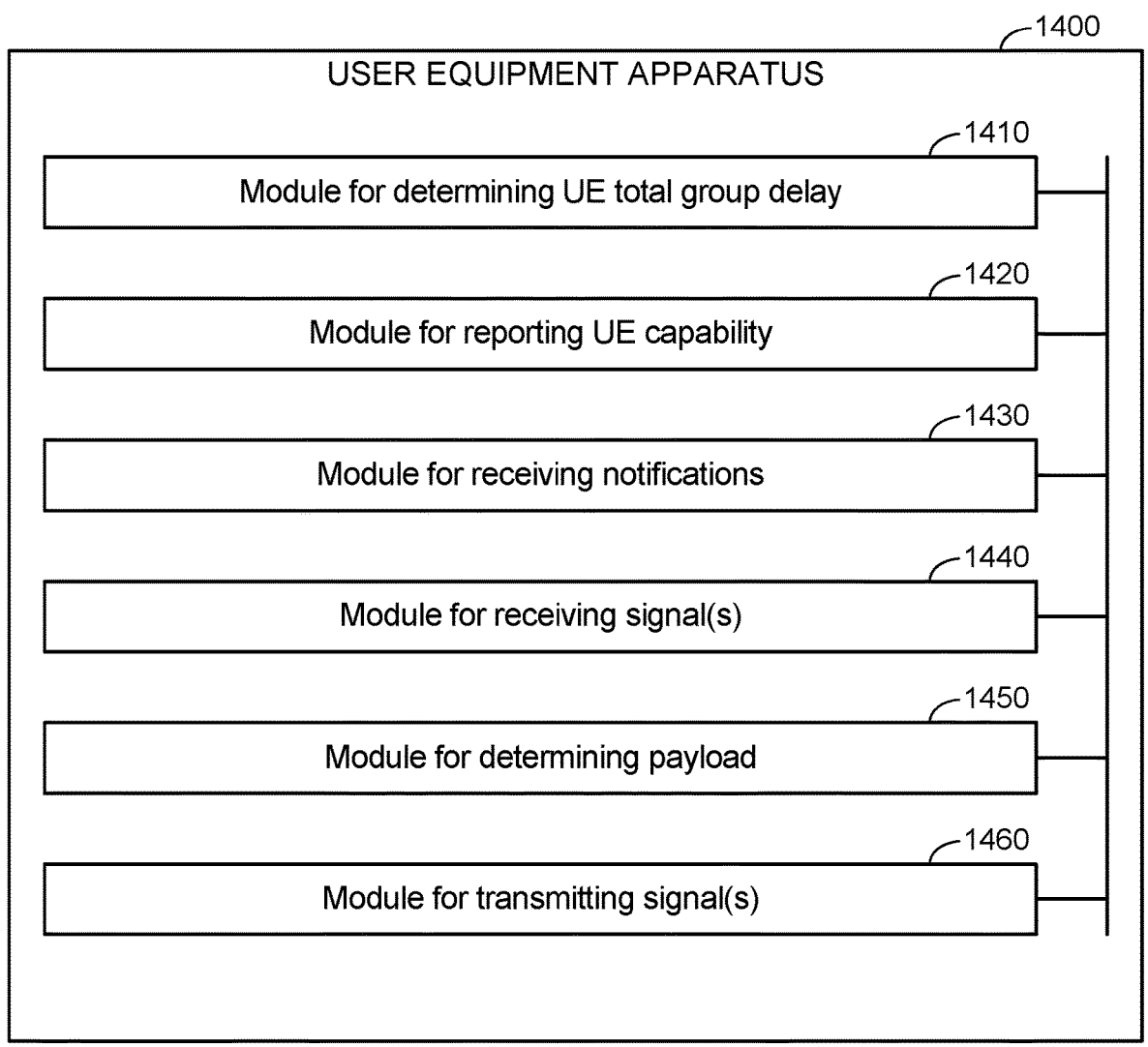

FIG. 14 illustrates an example user equipment apparatus 1400 represented as a series of interrelated functional modules connected by a common bus. A module for determining UE total group delay 1410 may correspond at least in some aspects to, for example, a processing system, such as processing system 332 in FIG. 3, as discussed herein. A module for reporting UE capability 1420 may correspond at least in some aspects to, for example, a communication device, such as communication device 308 in FIG. 3, and/or a processing system, such as processing system 332 in FIG. 3, as discussed herein. A module for receiving notifications 1430 may correspond at least in some aspects to, for example, a communication device, such as communication device 308 in FIG. 3, and/or a processing system, such as processing system 332 in FIG. 3, as discussed herein. A module for receiving signal(s) 1430 (e.g., RTTM signals, test signals, etc.) may correspond at least in some aspects to, for example, a communication device, such as communication device 308 in FIG. 3, and/or a processing system, such as processing system 332 in FIG. 3, as discussed herein. A module for determining payload 1450 may correspond at least in some aspects to, for example, a processing system, such as processing system 332 in FIG. 3, as discussed herein. A module for transmitting signal(s) 1460 (e.g., RTTR signals, test signals, etc.) may correspond at least in some aspects to, for example, a communication device, such as communication device 308 in FIG. 3, and/or a processing system, such as processing system 332 in FIG. 3, as discussed herein.

The functionality of the modules of FIGS. 13-14 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 13-14, as well as other components and functions described herein, may be implemented using any suitable means. Such means also may be implemented, at least in part, using corresponding structure as taught herein. For example, the components described above in conjunction with the "module for" components of FIGS. 13-14 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of a network entity, the method comprising:
   determining information indicating a network total group delay (GD) comprising a network transmission GD and a network reception GD,
   the network transmission GD indicating a time interval between a measured transmission time of a network Tx signal transmitted from the network entity and an actual transmission time of the network Tx signal leaving the network entity, and
   the network reception GD indicating a time interval between an actual arrival time of a network Rx signal at the network entity and a measured arrival time of the network Rx signal at the network entity;
   transmitting, to a user equipment (UE), one or more round trip time (RTT) measurement (RTTM) signals on RTTM resources comprising downlink (DL) physical layer resources, each RTTM signal comprising an RTTM waveform;
   receiving, from the UE, one or more RTT response (RTTR) signals on RTTR resources comprising uplink (UL) physical layer resources, each RTTR signal corresponding to one or more of the RTTM signals and comprising an RTTR waveform and an RTTR payload; and
   determining an RTT between the UE and the network entity based on the RTTM signal(s), the RTTR signal(s), and the information indicating the network total GD.

2. The method of claim 1, wherein the network entity is a network node or a core network entity.

3. The method of claim 1, wherein determining the information indicating the network total GD comprises:
   scheduling self-transmit and self-receive resources respectively for transmit and receive antennas of the network entity, the self-transmit and self-receive resources comprising physical layer resources, and the transmit and receive antennas being different antennas;
   transmitting a test signal from the transmit antenna on the self-transmit resource at transmit time tt, the transmit time tt being a time in a digital domain and corresponding to a frame, subframe, or a slot of the self-transmit resource in which symbols of the test signal are scheduled for transmission;
   listening on the receive antenna on the self-receive resource and detecting the reception of the test signal at receive time tr, the receive time being a time in the digital domain and corresponding to a frame, subframe, or a slot of the self-receive resource in which received symbols contained therein are recognized as the symbols of the test signal; and determining the information indicating the network total GD based on the transmit time tt and the receive time tr.

4. The method of claim 3, wherein information indicating multiple network total GDs are determined, each network total GD corresponding to any combination of the following:
one or more transmit antennas of the network entity, one or more receive antennas of the network entity, one or more modulation and coding schemes (MCSs), and/or one or more operating frequencies.

5. The method of claim 1,
wherein the RTTR payload of at least one of the one or more RTTR signals explicitly includes an actual UE response delay indicating a time interval between an actual RTTM arrival time t2' and an actual RTTR transmit time t3' at the UE, and
wherein the RTT is calculated based on the actual UE response delay, the information indicating the network total GD, and the measured total time.

6. The method of claim 5, further comprising determining a network total GD based on the information indicating the network total GD,
wherein the actual UE response delay includes an actual UE turn-around time (t3'−t2') and/or an actual UE Rx-Tx time difference (t2'−t3'),
wherein when the actual UE response delay includes the actual UE turn-around time, the RTT is calculated by subtracting a sum of the actual UE turn-around time and the network total GD from the measured total time, and/or
wherein when the actual UE response delay includes the actual UE Rx-Tx time difference, the RTT is calculated by subtracting the network total GD from a sum of the measured total time and Rx-Tx time difference.

7. The method of claim 1,
wherein the RTTR payload of at least one of the one or more RTTR signals explicitly includes a measured UE response delay indicating a time interval between a measured RTTM arrival time t2 and a measured RTTR transmit time t3 at the UE,
wherein an arrival time of the at least one RTTR signal deviates from an expected arrival time by a deviation amount representing a UE total GD comprising a UE transmission GD and a UE reception GD,
the UE transmission GD indicating a time interval between a measured transmission time of a UE Tx signal transmitted from the UE and an actual transmission time of the UE Tx signal leaving the UE, and
the UE reception GD indicating a time interval between an actual arrival time of a UE Rx signal at the UE and a measured arrival time of the UE Rx signal at the UE, and
wherein the RTT is calculated based on the measured UE response delay, the information indicating the network total GD, the deviation amount, and the measured total time.

8. The method of claim 7, further comprising determining a network total GD based on the information indicating the network total GD, wherein the measured UE response delay includes a measured UE turn-around time (t3−t2) and/or a measured UE Rx-Tx time difference (t2−t3),
wherein when the measured UE response delay includes the measured UE turn-around time, the RTT is calculated by subtracting a sum of the measured UE turn-around time, the network total GD, and the deviation amount from the measured total time, and/or
wherein when the actual UE response delay includes the measured UE Rx-Tx time difference, the RTT is calculated by subtracting a sum of the network total GD and the deviation amount from a sum of the measured total time and the measured Rx-Tx time difference.

9. The method of claim 1,
wherein the RTTR payload of at least one of the one or more RTTR signals explicitly includes a measured UE response delay indicating a time interval between a measured RTTM arrival time t2 and a measured RTTR transmit time t3 at the UE and/or explicitly includes a UE total GD comprising a UE transmission GD and a UE reception GD,
the UE transmission GD indicating a time interval between a measured transmission time of a UE Tx signal transmitted from the UE and an actual transmission time of the UE Tx signal leaving the UE, and
the UE reception GD indicating a time interval between an actual arrival time of a UE Rx signal at the UE and a measured arrival time of the UE Rx signal at the UE, and
wherein the RTT is calculated based on the UE response delay, the information indicating the network total GD, the UE total GD, and the measured total time.

10. The method of claim 9, further comprising determining a network total GD based on the information indicating the network total GD,
wherein the measured UE response delay includes a measured UE turn-around time (t3−t2) and/or a measured UE Rx-Tx time difference (t2−t3),
wherein when the measured UE response delay includes the measured UE turn-around time, the RTT is calculated by subtracting a sum of the measured UE turn-around time, the network total GD, and the UE total GD from the measured total time, and/or
wherein when the actual UE response delay includes the measured UE Rx-Tx time difference, the RTT is calculated by subtracting a sum of the network total GD and the UE total GD from a sum of the measured total time and the measured Rx-Tx time difference.

11. The method of claim 9,
wherein when the RTTR payload explicitly includes both the measured UE response delay and the UE reception GD, the measured UE response delay and the UE total GD used in the calculation of the RTT are the measured UE response delay and the UE total GD included in the RTTR payload,
wherein when the RTTR payload explicitly includes the measured UE response delay but does not include the UE reception GD, the measured UE response delay used in the calculation of the RTT is the measured UE response delay included in the RTTR payload and the UE total GD used in the calculation of the RTT is the UE total GD included in a previous RTTR payload, and
wherein when the RTTR payload does not include the measured UE response delay but does explicitly include the UE reception GD, the measured UE response delay used in the calculation of the RTT is the measured UE response delay included in a previous RTTR payload and the UE total GD used in the calculation of the RTT is the UE total GD included in the RTTR payload.

12. The method of claim 1, further comprising:
receiving a UE capability report from the UE, the UE capability report comprising one or more capabilities of the UE including accuracy of group delay measurements and/or capability of making use of calibration gaps to measure group delay dynamically,
wherein a bandwidth of the RTTM waveform is adjusted based on the UE's accuracy of group delay measurements.

13. The method of claim 1, further comprising:
receiving a request for scheduling of self-transmit and self-receive resources respectively for transmit and receive antennas of the UE, the self-transmit and self-receive resources comprising physical layer resources, and the transmit and receive antennas being different antennas of the UE;
scheduling the requested self-transmit and self-receive resources for the UE; and
notifying the UE of the scheduled self-transmit and self-receive resources.

14. A method of a user equipment (UE), the method comprising:
determining information indicating a UE total group delay (GD) comprising a UE transmission GD and a UE reception GD,
the UE transmission GD indicating a time interval between a measured transmission time of a UE Tx signal transmitted from the UE and an actual transmission time of the UE Tx signal leaving the UE, and
the UE reception GD indicating a time interval between an actual arrival time of a UE Rx signal at the UE and a measured arrival time of the UE Rx signal at the UE;
receiving, from a network entity, one or more round trip time (RTT) measurement (RTTM) signals on RTTM resources comprising downlink (DL) physical layer resources, each RTTM signal comprising an RTTM waveform;
determining one or more RTT response (RTTR) payloads for one or more RTTR signals, each RTTR signal corresponding to one or more of the RTTM signals and comprising an RTTR waveform and the RTTR payload; and
transmitting, to the network entity, the one or more RTTR signals on RTTR resources comprising uplink (UL) physical layer resources,
wherein for each RTTR signal, a transmission timing of the RTTR waveform is determined based on the UE total GD, or the RTTR payload is determined based on the UE total GD, or both.

15. The method of claim 14, wherein the network entity is a network node or a core network entity.

16. The method of claim 14, wherein determining the information indicating the UE total GD comprises:
requesting to the network entity scheduling self-transmit and self-receive resources respectively for transmit and receive antennas of the UE, the self-transmit and self-receive resources comprising physical layer resources, and the transmit and receive antennas being different antennas;
transmitting a test signal from the transmit antenna on the self-transmit resource at transmit time tt, the transmit time tt being a time in a digital domain and corresponding to a frame, subframe, or a slot of the self-transmit resource in which symbols of the test signal are scheduled for transmission;
listening on the receive antenna on the self-receive resource and detecting the reception of the test signal at receive time tr, the receive time being a time in the digital domain and corresponding to a frame, subframe, or a slot of the self-receive resource in which received symbols contained therein are recognized as the symbols of the test signal; and
determining the UE total GD based on the transmit time tt and the receive time tr.

17. The method of claim 16, wherein information indicating multiple UE total GDs are determined, each UE total GD corresponding to any combination of the following:
one or more transmit antennas of the UE, one or more receive antennas of the UE, one or more modulation and coding schemes (MCSs), and/or one or more operating frequencies.

18. The method of claim 16, wherein the scheduling of the self-transmit and the self-receive resources is requested such that the self-transmit and self-the receive resources for calibration gap and/or rank reduction are scheduled.

19. The method of claim 14, wherein when a transmission timing of at least one RTTR signal does not deviate from a timing advance (TA) commanded by the network entity, the RTTR payload of the at least one RTTR signal explicitly includes an actual UE response delay calculated based on the UE total GD and a measured UE response delay, the actual UE response delay indicating a time interval between an actual RTTM arrival time t2' and an actual RTTR transmit time t3' at the UE, and the measured UE response delay indicating a time interval between a measured RTTM arrival time t2 and a measured RTTR transmit time t3 at the UE.

20. The method of claim 19,
wherein the actual UE response delay includes an actual UE turn-around time (t3'−t2') and/or an actual UE Rx-Tx time difference (t2'−t3'),
wherein the measured UE response delay includes a measured UE turn-around time (t3−t2) and/or a measured UE Rx-Tx time difference (t2−t3), and
wherein the actual UE turn-around time is calculated by adding the UE total GD to the measured UE turn-around time, and/or the actual UE Rx-Tx time difference is calculated by subtracting the UE total GD from the measured UE Rx-Tx time difference.

21. The method of claim 14, wherein when a transmission timing of at least one RTTR signal deviates from a timing advance (TA) commanded by the network entity by a deviation amount representing the UE total GD, the RTTR payload of the at least one RTTR signal explicitly includes a measured UE response delay and/or the UE total GD, the measured UE response delay indicating a time interval between a measured RTTM arrival time t2 and a measured RTTR transmit time t3 at the UE.

22. The method of claim 21, wherein the measured UE response delay includes a measured UE turn-around time (t3−t2) and/or a measured UE Rx-Tx time difference (t2−t3).

23. The method of claim 21, wherein when the transmission timing of the at least one RTTR signal deviates from the TA commanded by the network entity by the deviation amount representing the UE total GD, the RTTR payload of the at least one RTTR signal explicitly includes the measured UE response delay more frequently than the UE total GD.

24. The method of claim 14, further comprising:
reporting (1110) to the network entity a UE capability report comprising one or more capabilities of the UE including accuracy of group delay measurements and/or capability of making use of calibration gaps to measure group delay dynamically.

25. A network entity, comprising:
a communication device, a processor and a memory configured to:

determine information indicating a network total group delay (GD) comprising a network transmission GD and a network reception GD, the network transmission GD indicating a time interval between a measured transmission time of a network Tx signal transmitted from the network entity and an actual transmission time of the network Tx signal leaving the network entity, and the network reception GD indicating a time interval between an actual arrival time of a network Rx signal at the network entity and a measured arrival time of the network Rx signal at the network entity;

transmit, to a user equipment (UE), one or more round trip time (RTT) measurement (RTTM) signals on RTTM resources comprising downlink (DL) physical layer resources, each RTTM signal comprising an RTTM waveform;

receive, from the UE, one or more RTT response (RTTR) signals on RTTR resources comprising uplink (UL) physical layer resources, each RTTR signal corresponding to one or more of the RTTM signals and comprising an RTTR waveform and an RTTR payload; and determine an RTT between the UE and the network entity based on the RTTM signal(s), the RTTR signal(s), and the information indicating the network total GD.

26. The network entity of claim 25, wherein, to determine information indicating the network GD, the communication device, the processor, and the memory are configured to:

schedule self-transmit and self-receive resources respectively for transmit and receive antennas of the network entity, the self-transmit and self-receive resources comprising physical layer resources, and the transmit and receive antennas being different antennas;

transmit a test signal from the transmit antenna on the self-transmit resource at transmit time tt, the transmit time tt being a time in a digital domain and corresponding to a frame, subframe, or a slot of the self-transmit resource in which symbols of the test signal are scheduled for transmission;

listen on the receive antenna on the self-receive resource and detecting the reception of the test signal at receive time tr, the receive time being a time in the digital domain and corresponding to a frame, subframe, or a slot of the self-receive resource in which received symbols contained therein are recognized as the symbols of the test signal; and determine information indicating the network total GD based on the transmit time tt and the receive time tr.

27. The network entity of claim 25, wherein the RTTR payload of at least one of the one or more RTTR signals explicitly includes an actual UE response delay indicating a time interval between an actual RTTM arrival time t2' and an actual RTTR transmit time t3' at the UE, and wherein in determining the RTT, the communication device, the processor and the memory are configured to:

determine a measured RTTM transmit time t1 for each of the one or more transmitted RTTM signals, the measured RTTM transmit time t1 being a time in a digital domain corresponding to a frame, subframe, or a slot of the RTTM resource allocated for symbols of the RTTM signal;

determine a measured RTTR arrival time t4 for each of the one or more received RTTR signals, the measured RTTR arrival time t4 being a time in the digital domain corresponding to a frame, subframe, or a slot of the RTTR resource containing the symbols of the RTTR signal;

determine a measured total time as (t4−t1); and calculate the RTT based on the actual UE response delay, the information indicating the network total GD, and the measured total time.

28. The network entity of claim 25, wherein the RTTR payload of at least one of the one or more RTTR signals explicitly includes a measured UE response delay indicating a time interval between a measured RTTM arrival time t2 and a measured RTTR transmit time t3 at the UE, wherein an arrival time of the at least one RTTR signal deviates from an expected arrival time by the deviation amount representing a UE total GD comprising a UE transmission GD and a UE reception GD, the UE transmission GD indicating a time interval between a measured transmission time of a UE Tx signal transmitted from the UE and an actual transmission time of the UE Tx signal leaving the UE, and the UE reception GD indicating a time interval between an actual arrival time of a UE Rx signal at the UE and a measured arrival time of the UE Rx signal at the UE, and wherein in determining the RTT, the communication device, the processor and the memory are configured to:

determine a measured RTTM transmit time t1 for each of the one or more transmitted RTTM signals, the measured RTTM transmit time t1 being a time in a digital domain corresponding to a frame, subframe, or a slot of the RTTM resource allocated for symbols of the RTTM signal;

determine a measured RTTR arrival time t4 for each of the one or more received RTTR signals, the measured RTTR arrival time t4 being a time in the digital domain corresponding to a frame, subframe, or a slot of the RTTR resource containing the symbols of the RTTR signal;

determine a measured total time as (t4−t1); and calculate RTT based on the measured UE response delay, the information indicating the network total GD, and the deviation amount from the measured total time.

29. The network entity of claim 25, wherein the RTTR payload of at least one of the one or more RTTR signals explicitly includes a measured UE response delay indicating a time interval between a measured RTTM arrival time t2 and/or a UE total GD comprising a UE transmission GD and a UE reception GD, the UE transmission GD indicating a time interval between a measured transmission time of a UE Tx signal transmitted from the UE and an actual transmission time of the UE Tx signal leaving the UE, and the UE reception GD indicating a time interval between an actual arrival time of a UE Rx signal at the UE and a measured arrival time of the UE Rx signal at the UE, wherein in determining the RTT, the communication device, the processor and the memory are configured to:

determine a measured RTTM transmit time t1 for each of the one or more transmitted RTTM signals, the measured RTTM transmit time t1 being a time in a digital domain corresponding to a frame, subframe, or a slot of the RTTM resource allocated for symbols of the RTTM signal;

determine a measured RTTR arrival time t4 for each of the one or more received RTTR signals, the measured RTTR arrival time t4 being a time in the digital domain corresponding to a frame, subframe, or a slot of the RTTR resource containing the symbols of the RTTR signal;

determine a measured total time as (t4−t1); and calculate RTT based on the measured UE response delay, the information indicating the network total GD, the UE total GD, and the measured total time.

30. A user equipment (UE), comprising:

a communication device, a processor and a memory configured to:

determine information indicating a UE total group delay (GD) comprising a UE transmission GD and a UE reception GD, the UE transmission GD indicating a time interval between a measured transmission time of a UE Tx signal transmitted from the UE and an actual transmission time of the UE Tx signal leaving the UE, and the UE reception GD indicating a time interval between an actual arrival time of a UE Rx signal at the UE and a measured arrival time of the UE Rx signal at the UE;

receive, from a network entity, one or more round trip time (RTT) measurement (RTTM) signals on RTTM resources comprising downlink (DL) physical layer resources, each RTTM signal comprising an RTTM waveform;

determine one or more RTT response (RTTR) payloads for one or more RTTR signals, each RTTR signal corresponding to one or more of the RTTM signals and comprising an RTTR waveform and the RTTR payload; and transmit, to the network entity, the one or more RTTR signals on RTTR resources comprising uplink (UL) physical layer resources, wherein for each RTTR signal, a transmission timing of the RTTR waveform is determined based on the UE total GD, or the RTTR payload is determined based on the UE total GD, or both.

31. The UE of claim 30, wherein determining the information indicating the UE total GD, the communication device, the processor, and the memory are configured to:

request to the network entity scheduling self-transmit and self-receive resources respectively for transmit and receive antennas of the UE, the self-transmit and self-receive resources comprising physical layer resources, and the transmit and receive antennas being different antennas;

transmit a test signal from the transmit antenna on the self-transmit resource at transmit time tt, the transmit time tt being a time in a digital domain and corresponding to a frame, subframe, or a slot of the self-transmit resource in which symbols of the test signal are scheduled for transmission;

listen on the receive antenna on the self-receive resource and detecting the reception of the test signal at receive time tr, the receive time being a time in the digital domain and corresponding to a frame, subframe, or a slot of the self-receive resource in which received symbols contained therein are recognized as the symbols of the test signal; and determine information indicating the UE total GD based on the transmit time tt and the receive time tr.

32. The UE of claim 30, wherein when a transmission timing of at least one RTTR signal does not deviate from a timing advance (TA) commanded by the network entity, the RTTR payload of the at least one RTTR signal explicitly includes an actual UE response delay calculated based on the UE total GD and a measured UE response delay, the actual UE response delay indicating a time interval between an actual RTTM arrival time t2' and an actual RTTR transmit time t3' at the UE, and the measured UE response delay indicating a time interval between a measured RTTM arrival time t2 and a measured RTTR transmit time t3 at the UE, wherein the actual UE response delay includes an actual UE turn-around time (t3'−t2') and/or an actual UE Rx-Tx time difference (t2'−t3'), wherein the measured UE response delay includes a measured UE turn-around time (t3−t2) and/or a measured UE Rx-Tx time difference (t2−t3), and wherein the communication device, the processor and the memory are configured to:

calculate the actual UE turn-around time by adding the UE total GD to the measured UE turn-around time, and/or calculate the actual UE Rx-Tx time difference by subtracting the UE total GD from the measured UE Rx-Tx time difference.

33. The UE of claim 30, wherein when a transmission timing of at least one RTTR signal deviates from a timing advance (TA) commanded by the network entity by a deviation amount representing the UE total GD, the RTTR payload of the at least one RTTR signal explicitly includes a measured UE response delay and/or the UE total GD, the measured UE response delay indicating a time interval between a measured RTTM arrival time t2 and a measured RTTR transmit time t3 at the UE, and wherein the measured UE response delay includes a measured UE turn-around time (t3−t2) and/or a measured UE Rx-Tx time difference (t2−t3).

34. The UE of claim 33, wherein when the transmission timing of the at least one RTTR signal deviates from the TA commanded by the network entity by the deviation amount representing the UE total GD, the RTTR payload of the at least one RTTR signal explicitly includes the measured UE response delay more frequently than the UE total GD.

* * * * *